US010600240B2

(12) United States Patent
Walker et al.

(10) Patent No.: US 10,600,240 B2
(45) Date of Patent: Mar. 24, 2020

(54) TOY SCANNER

(71) Applicant: LEGO A/S, Billund (DK)

(72) Inventors: Morgan James Walker, Aarhus C (DK); Jonathan B. Bennink, Aarhus C (DK); Luka Kapeter, Billund (DK); Henrik Munk Storm, Randbøl (DK)

(73) Assignee: LEGO A/S (DK)

( * ) Notice: Subject to any disclaimer, the term of this patent is extended or adjusted under 35 U.S.C. 154(b) by 0 days.

(21) Appl. No.: 16/089,301

(22) PCT Filed: Mar. 30, 2017

(86) PCT No.: PCT/EP2017/057514
§ 371 (c)(1),
(2) Date: Sep. 27, 2018

(87) PCT Pub. No.: WO2017/167862
PCT Pub. Date: Oct. 5, 2017

(65) Prior Publication Data
US 2019/0122428 A1    Apr. 25, 2019

(30) Foreign Application Priority Data

Apr. 1, 2016    (DK) .................................. 2016 70193

(51) Int. Cl.
*G06T 17/05* (2011.01)
*G01B 11/24* (2006.01)
(Continued)

(52) U.S. Cl.
CPC ............. *G06T 17/05* (2013.01); *A63H 33/08* (2013.01); *A63H 33/086* (2013.01); *G01B 11/24* (2013.01);
(Continued)

(58) Field of Classification Search
None
See application file for complete search history.

(56) References Cited

U.S. PATENT DOCUMENTS

| 6,128,405 A | 10/2000 | Fujii |
| 6,259,815 B1 | 7/2001 | Anderson et al. |

(Continued)

FOREIGN PATENT DOCUMENTS

| CN | 203298744 U | 11/2013 |
| DE | 102012222319 A1 | 6/2014 |

(Continued)

OTHER PUBLICATIONS

"Rapid Acquisition of Specular and Diffuse Normal Maps from Polarized Spherical Gradient Illumination" by Wan-Cun Ma et al., Eurographics Symposium on Rendering (2007), Jan Kautz and Sumanta Pattanaik (Editors).

(Continued)

*Primary Examiner* — Vu Nguyen
(74) *Attorney, Agent, or Firm* — Day Pitney LLP

(57) ABSTRACT

A system for acquiring a 3D digital representation of a physical object, the system comprising: A scanning station comprising an object support for receiving a physical object; an image capturing device operable to capture two or more images of a physical object when the physical object is placed on the object support, wherein the two or more images are taken from different view points relative to the physical object; and a processor configured to process the captured two or more images and to create a 3D digital model of the physical object.

31 Claims, 11 Drawing Sheets

(51) Int. Cl.
*G06T 17/00* (2006.01)
*A63H 33/08* (2006.01)
*A63F 13/655* (2014.01)

(52) U.S. Cl.
CPC ............ *G06T 17/00* (2013.01); *A63F 13/655* (2014.09); *A63F 2300/1087* (2013.01); *A63F 2300/695* (2013.01); *G06T 2200/04* (2013.01); *G06T 2200/08* (2013.01)

(56) References Cited

U.S. PATENT DOCUMENTS

| | | | |
|---|---|---|---|
| 7,492,476 | B1 | 2/2009 | Dodge et al. |
| 8,023,724 | B2 | 9/2011 | Barbour |
| 2001/0005204 | A1 | 6/2001 | Matsumoto et al. |
| 2001/0025229 | A1 | 9/2001 | Moritz et al. |
| 2002/0043632 | A1 | 4/2002 | Miramonti et al. |
| 2002/0061130 | A1 | 5/2002 | Kirk et al. |
| 2002/0159628 | A1 | 10/2002 | Matusik et al. |
| 2002/0186216 | A1 | 12/2002 | Baumberg et al. |
| 2003/0038801 | A1 | 2/2003 | Terauchi et al. |
| 2003/0202691 | A1 | 10/2003 | Beardsley |
| 2003/0218607 | A1 | 11/2003 | Baumberg |
| 2003/0231173 | A1 | 12/2003 | Matusik et al. |
| 2003/0231793 | A1 | 12/2003 | Crampton |
| 2004/0037459 | A1 | 2/2004 | Dodge |
| 2004/0141187 | A1 | 7/2004 | Johnston et al. |
| 2005/0068544 | A1 | 3/2005 | Doemens et al. |
| 2007/0053679 | A1 | 3/2007 | Beniyama et al. |
| 2007/0223816 | A1 | 9/2007 | Horovitz et al. |
| 2009/0067706 | A1 | 3/2009 | Lapa |
| 2009/0091581 | A1 | 4/2009 | Lapa |
| 2010/0156901 | A1 | 6/2010 | Park et al. |
| 2010/0164953 | A1 | 7/2010 | Wouhaybi et al. |
| 2011/0254841 | A1 | 10/2011 | Lim et al. |
| 2012/0237111 | A1 | 9/2012 | Sinha et al. |
| 2012/0306853 | A1 | 12/2012 | Wright et al. |
| 2012/0306876 | A1 | 12/2012 | Shotton et al. |
| 2013/0080111 | A1 | 3/2013 | Dunik et al. |
| 2013/0215233 | A1 | 8/2013 | Wang et al. |
| 2013/0215239 | A1 | 8/2013 | Wang et al. |
| 2013/0335528 | A1 | 12/2013 | Vishwanath et al. |
| 2014/0142900 | A1 | 5/2014 | Andre |
| 2014/0300612 | A1 | 10/2014 | Li et al. |
| 2014/0378023 | A1 | 12/2014 | Muthyala et al. |
| 2015/0042757 | A1 | 2/2015 | Goodman et al. |
| 2015/0080125 | A1 | 3/2015 | Andre et al. |
| 2015/0097931 | A1 | 4/2015 | Hatzilias et al. |
| 2015/0109424 | A1* | 4/2015 | Lee ..................... A61C 9/006 348/50 |
| 2015/0142394 | A1 | 5/2015 | Mehr et al. |
| 2015/0243035 | A1 | 8/2015 | Narasimha et al. |
| 2016/0067628 | A1* | 3/2016 | Reid ..................... A63H 33/42 |

FOREIGN PATENT DOCUMENTS

| | | |
|---|---|---|
| FR | 3013492 B1 | 4/2017 |
| JP | 2004139294 A | 5/2004 |
| JP | 2005249402 A | 9/2005 |
| JP | 2015012375 A | 1/2015 |

OTHER PUBLICATIONS

Breuckmann Scanner, d-STATION [online, datasheet][retrieved on Oct. 27, 2016]. Retrieved from: < http://www.aicon3d.com/fileadmin/user_upload/produkte/en/breuckmann_Scanner/d-STATION/pdf/Brochure_d-STATION_EN_OI.pdf > Archived version [uploaded Mar. 4, 2016] retrieved from: < https://web.archive.org/web/20160304173819/http://aicon3d.com/products/breuckmann-scanner/d-station/at-a-glance.html >.

MakerBot shows off Digitizer 3D Scanner, optimized for 3D Printing / 3D Printer News & 3D Printing News, [retrieved on Mar. 15, 2015] from: <http://www.3ders.org/articles/20130921-makerbot-shows-off-digitizer-3d-scanner-optimized-for-3d-printing.html>.

DKPTO Search Report and Opinion issued in Danish priority application No. PA201670193, dated Nov. 1, 2016.

International Search Report issued in corresponding international application No. PCT/EP2017/057514, dated Sep. 12, 2017.

Written Opinion of the International Searching Authority issued in corresponding international application No. PCT/EP2017/057514, dated Sep. 12, 2017.

International Preliminary Report on Patentability with amended claims issued in corresponding international application No. PCT/EP2017/057514, dated Jul. 20, 2018.

Anonymous: "LEGO Mobile Rocket Transport Instructions 6950, Space", Dec. 31, 1982; XP055403870, Retrieved from the Internet on on Sep. 5, 2017: < http://lego.brickinstructions.com/lego instructions/set/6950/Mobile Rocket_Transport >.

3D Laser Scanner [retrieved on Oct. 26, 2016]. Retrieved from: < http://www.philohome.com/scan3dlaser/scan3dlaser.htm > Archived version [uploaded on Mar. 18, 2016] retrieved from: < https://web.archive.org/web/20160318174907/http://www.philohome.com/scan3dlaser/scan3dlaser.htm >.

DAVID Laser scanner, Making of. YouTube [online, video] [uploaded on Feb. 16, 2009]. Retrieved from: < https://www.youtube.com/watch?v=uC-99bjh2dE >.

* cited by examiner

TOY SCANNER

CROSS-REFERENCE TO RELATED APPLICATIONS

This application is a U.S. National Stage of International Application No. PCT/EP2017/057514, filed on 30 Mar. 2017 and published on 5 Oct. 2017, as WO 2017/167862 A2, which claims the benefit of priority to Danish Patent Application No. DK PA201670193, filed on 1 Apr. 2016. The content of each of the above referenced patent applications is incorporated herein by reference in its entirety for any purpose whatsoever.

FIELD OF THE INVENTION

The invention relates to toy enhanced game systems, e.g. including systems comprising toy construction elements having coupling members for releasably interconnecting the toy construction elements with each other. In particular, the invention relates to methods and apparatus for obtaining a 3D digital representation of a physical object,

BACKGROUND

Toy construction systems have been known for decades. Over the years, simple box-shaped building blocks have been supplemented with other construction elements with either a specific appearance or a mechanical or electrical function to enhance the play value. Such functions include e.g. motors, switches and lamps, but also programmable processors that accept input from sensors and can activate function elements in response to received sensor inputs.

Several attempts have been made to control virtual game play by means of physical toys.

For example, US 2011/298922 discloses a system for extracting an image of a physical object. The extracted image can be digitally represented on a display device as part of a virtual world, or video game, where the objects inhibiting the virtual world and/or video game, were designed and built from the construction set in the real-world. However, in many video games or other virtual environments it is desirable to provide three-dimensional virtual objects.

US 2016/0067628 discloses a scanner for scanning a toy.

According to at least one aspect, it is desirable to provide a system that allows three-dimensional virtual objects to be created from physical toy construction models in a user-friendly, yet reliable and accurate manner. In particular, it is desirable to provide such an apparatus which is easy to use and that provides 3D representations that accurately represent the 3D shape of the physical toy construction model. It is generally desirable that such an apparatus is robust in respect of factors such as vibrations or other disturbances, and/or other factors.

SUMMARY

According to a first aspect, disclosed herein is a toy construction system comprising:
- a plurality of toy construction elements, each comprising one or more coupling members configured for detachably interconnecting the toy construction elements with each other so as to form a toy construction model;
- a scanning station comprising an object support for receiving a physical object, in particular a toy construction model constructed from one or more of said toy construction elements;
- a sensor device operable to capture radiation from the physical object when the physical model is placed on the object support; wherein the scanning station and/or the sensor device are configured to cause the sensor device to receive radiation at different view points relative to the physical object;
- an interface configured to transmit a signal indicative of the captured radiation to a processor for processing the captured radiation and for creating a 3D digital representation of the physical object.

Consequently, one or more captured images of the physical object, e.g. a toy construction model, may be used as a basis for generating a virtual object having a user-defined appearance in the virtual environment. A user may create a physical toy construction model or otherwise select or create a physical object resembling an item to be used as a virtual object in a computer-generated virtual environment. As the user may select, create or construct these objects from toy construction elements, the user has a large degree of freedom as to how the object is constructed. Moreover, the system provides the user with a flexible, yet easy-to understand and easy-to use mechanism for influencing the desired appearance of the virtual object in the virtual environment. When the scanning station captures radiation from multiple view points while the physical object positioned on the object support, a high-quality 3D representation of the object may be obtained.

When the object support comprises a retaining mechanism for receiving and holding the object, such as one or more coupling members compatible with the toy construction system, the user may connect the constructed model to the object support in an easy manner while facilitating a reliable, accurate and reproducible positioning of the toy construction model on the object support. For example, when the object support or the sensor device is moved so as to capture radiation from different view points relative to the toy construction model, the risk for inadvertently changing the orientation of the toy construction model relative to the object support is reduced. Moreover, detrimental effects of vibrations of the toy construction model may be reduced. Accordingly, in some embodiments, the object support comprises one or more coupling members compatible with the toy construction system. The one or more coupling members are configured to engage with one or more coupling members of one or more of the toy construction elements and configured for detachably connecting one or more of said plurality of toy construction elements of the toy construction model to the object support.

The object support may comprise a turntable configured to rotate around an axis of rotation so as to allow the sensor device to capture radiation from different viewpoints relative to the physical object. For example, when the sensor device comprises one or more image capture devices, the sensor device may capture multiple images from different viewpoints relative to a physical object that is placed on the turntable. Hence, radiation from different parts of the physical object may be captured in a controlled manner. The turntable may comprise markers, e.g. along a circumference of the turntable and the processor may be configured, e.g. based on one or more captured images, to determine an angular position of the turntable associated with the captured images. The processor may further be configured to detect a tilt or other displacement of the turntable relative to the sensor device, so as to allow computation of respective viewpoints relative to the toy construction model from which radiation, e.g. respective images, have been captured.

For example, this determination may be performed by a structure from motion technique.

In some embodiments, the object support comprises an object support base and a detachable support element, e.g. a support element formed as one of the toy construction elements or constructible from two or more of the toy construction elements. The object support base may be a stationary or a movable platform, e.g. a turntable. The support element may be detachably connectable to the object support base and comprise said one or more coupling members configured for detachably connecting one or more toy construction elements of the toy construction model to the object support. Accordingly, the toy construction model may be constructed on top of a support element, e.g. a base plate or a pedestal. The toy construction element may then be securely placed on and later removed from the object support base, e.g. a turntable. In many situations, users build intricate and sometimes quite fragile models. Constructing the model on a support element facilitates handling of the toy construction model, such as attachment on and detachment from the object support base, while reducing the risk of inadvertently damaging the toy construction element. Moreover, the support element may also serve as a stand or pedestal for storing or displaying the model. The support element may also allow the toy construction element to be arranged elevated above a top surface of the object support base, thus allowing the sensor device to capture radiation from downward oriented surfaces of the toy construction model which, in turn, facilitates a more accurate 3D representation to be created. When the support element is constructible from toy construction elements, different support members, e.g. support members having different heights or otherwise different shapes or size may be easily created so as to accommodate different models.

The processor may be configured to detect the object support and omit it from the created 3D representation. For example, the detection may be performed based on one or more known properties of the object support, e.g. a known color, texture, shape, size, etc. or a combination thereof. In some embodiments, the processor may provide a user-interface allowing a user-assisted omission of the object support, e.g. by allowing a user to point out the object support in a 3D representation.

In some embodiments, the support element comprises a pedestal wherein said one or more coupling members configured for releasably connecting one or more toy construction elements of the toy construction model to the object support are positioned at an uppermost end of the pedestal.

In some embodiments, the support element comprises a base portion, e.g. a base plate, and wherein the object support base comprises a retaining member configured to engage and retain the base portion in attachment with the object support base. For example, the object support base may comprise a recess or other receptacle shaped and size to snugly receive the base portion. The object support base may comprise a retaining mechanism for preventing the physical object to be displaced during the scanning process, e.g. a clamping mechanism, a ski-boot mechanism, a bayonet-type mechanism or the like. The retaining mechanism may e.g. comprise a slidable, pivotable or otherwise movable locking member that may be moved between an open position and a locking position. When the locking member is in its open position the support element may be placed in operational position on the turntable and be removed from the object support base. When the locking member is in its locked position, the support element is held in position on the object support base and prevented from sliding or wobbling around, e.g. due to the movement of the object support base or the sensor device. In some embodiments, the retaining mechanism comprises a spring biased locking member. In some embodiments, the object support base comprises a user-activatable release member configured to cause, when activated, the retaining mechanism to disengage. For example, the release member may be a slider, a button, a lever, or the like. In one embodiment, the release member comprises a button formed by a part of an upper surface of the object support base. For example, in an embodiment where the object support base comprises a turntable, the button may be formed so as to partially or even completely surround the axis of rotation of the turntable, thus allowing a user to activate the release member regardless of the current angular position of the turntable.

In some embodiments, the object support comprises a turntable and a drive mechanism for operating the turntable. The drive mechanism may be manual, e.g. user-activated by a lever, a wheel, a crank, or the like, and comprise a suitable drive train e.g. comprising wheels, belts or the like. In some embodiments, the drive mechanism is motor driven, e.g. manually controllable or controlled by the processor or the sensor device.

When the drive mechanism is at least partially constructible from said toy construction elements, thus allowing re-use of toy construction elements of the toy construction system and facilitating construction of the drive mechanism by a user who has prior experience with the toy construction system.

The sensor device may comprise one or more sensors that detect light or other forms of electromagnetic radiation, such as light or other electromagnetic radiation reflected by surfaces of a physical object in a field of view of the sensor device. The sensor device may comprise an array of sensors, such as a CCD chip, or a single sensor that is operable to scan across a field of view, or a combination of a number of sensors that are scanned. Hence, the physical object may be passive in that it does not need to actively emit any sound, light, radio-signals, electrical signals, or the like. Moreover, the sensor device may be operable to capture images in a contactless fashion without the establishment of any electrical contact, communications interface or the like.

In some embodiments, the sensor device comprises an image capture device operable to capture two or more images of the physical object when the physical object is placed on the object support, wherein the two or more images are taken from different viewpoints relative to the physical object.

Each image may be a picture or another form of two-dimensional representation of a field of view of the image capturing device which representation allows the determination of a shape and/or colour and/or size of an object within the field of view. The image may comprise a 2D array of pixels or other array elements, each array element representing sensed information associated with a point or direction within the field of view. The sensed information may include an intensity of a received radiation or wave, a frequency/wavelength of the received radiation or wave, a distance map, a polarisation map, a map of surface normal, and/or other suitable sensed quantity.

Accordingly, the image capture device may comprise one or more digital cameras responsive to visible light, to infrared light, and/or the like. For example, the image capture device may comprise two digital cameras adapted at respective viewpoints relative to the object support, e.g. at respective elevations relative to the object support. The image capture device may comprise one or more depth cameras operable to also detect distance information of respective points within the field of view relative to the camera position. Some embodiments of a sensor device may comprise a laser. In some embodiments, the image capture device is configured to capture depth information in addition to light intensity data (such as RGB data). In some embodiments, the image capture device is configured to capture information indicative of surface normals of one or more surfaces within a field of view of the digital camera. For example, an image capture device may be configured to obtain polarisation data of the received light. The image capture device and/or the processor may be configured to determine local surface normals from the obtained polarisation data. The captured surface normals may also be transformed into a world coordinate system based on the detected tilt or other displacements of the turntable relative to the camera. Examples of camera sensors that are capable of detecting surface normal include the system disclosed in U.S. Pat. No. 8,023,724. Other examples of techniques for determining surface normal include the techniques described in "Rapid Acquisition of Specular and Diffuse Normal Maps from Polarized Spherical Gradient Illumination" by Wan-Cun Ma et al., Eurographics Symposium on Rendering (2007), Jan Kautz and Sumanta Pattanaik (Editors). The sensor device may output analogue or digital signals indicative of the captured radiation, e.g. of one or more captured images, e.g. as digital images or other data maps, as a video stream, and/or the like.

The object support may be arranged movably relative to the sensor device and/or the sensor device may be arranged movably relative to the object support.

In particular, in some embodiments, the sensor device is movably arranged relative to the object support which, in turn may be fixed relative to a base plate or similar support. In some embodiments, the sensor device may be arranged to rotate around the object support, e.g. around a vertical axis which may be aligned with a centre of the object support. Alternatively or additionally, the sensor device may be movable to different heights relative to the object support.

In some embodiments, the scanning station comprises a rotatable member configured to rotate around an axis of rotation. The rotatable member may comprise one or more cameras arranged at a radial distance from the axis of rotation and facing the axis of rotation. For example, the rotatable member may comprise a single camera or multiple cameras at different axial positions. The one or more cameras may be connected stationary relative to the rotatable member or movable relative to the rotatable member, e.g. along at least the axial direction defined by the rotatable member. The rotatable member may also comprise one or more background portions arranged at a radial distance from the axis of rotation such that the background portion defines a background surface within the field of view of one or more of the one or more cameras. In some embodiments, the background portion is arranged at least at a position diametrically opposite the camera relative to the axis of rotation. The rotatable member may comprise a circumferential wall defining a void for receiving the physical object and configured to rotate around an axis of rotation projecting through said void; in particular, the circumferential wall may at least partially surround the axis of rotation. The object support may at least partially extend into the void so as to provide a stationary support for an object placed in said void while the circumferential wall rotates around the object. The sensor device is connected to the circumferential wall, e.g. facing radially inwards towards the axis of rotation. In some embodiments, the rotatable member may be generally cup or dome shaped or cylindrically shaped or be formed as a receptacle which is configured to receive the object to be scanned. The rotatable member may thus define a circumferential wall partially or completely surrounding the axis of rotation and defining a void for receiving an object such that the circumferential wall rotates around an object positioned inside the void defined by the rotatable wall. The one or more cameras may be arranged at the circumferential wall of the receptacle and an opposite portion of the wall defines the background portion. The receptacle may be provided with a lid so as to define an enclosure substantially surrounding the object to be scanned. The rotatable member may be arranged to rotate around a stationary platform arranged such that the axis of rotation of the rotatable member projects through the platform, e.g. normal to the platform. The object to be scanned can thus be positioned on top of the platform such that the object is circumferentially surrounded by the circumferential wall defined by the rotatable member. The rotatable member may be manually driven by a drive mechanism, e.g. as described herein with respect to the turntable. Alternatively, the rotatable member may be driven by a motor. The rotatable member may also include light sources for illuminating an object positioned in the void defined by the rotatable member.

The processor may perform multiple stages of a multi-stage process for creating a 3D digital representation based on the captured radiation, e.g. based on captured images. In some embodiments, the process uses a suitable scheme for sensor pose estimation, e.g. based on a non-repeating colored pattern arranged on the turntable that is image-processed macroscopically and/or through a distance-to-edge measurement. Other embodiments may use markers.

Accordingly, the processor may be adapted to create a 3D digital representation from light intensity data and/or from other sensed data, such as depth data, e.g. in the form of one or more depth maps, from polarisation data and/or surface normal data or a combination thereof. The process may use structure from motion techniques, space carving techniques or other suitable techniques. If the sensor provides a field of detected surface normal, these may be used to detect marker features, e.g. edges or corners or other features with abrupt changes in surface normal directions, for use in a structure from motion process. In other embodiments the detected surface normal may be used to transform a voxel representation of the object (e.g. as obtained by a space carving process) into an accurate surface mesh. Generally, the 3D digital representation may include any suitable type of representation, e.g. a surface mesh of polygons, a voxel representation, etc. or a combination thereof.

Consequently, a plurality of captured images of the physical object, e.g. of a physical toy construction model, may be used as a basis for generating a virtual object having a three-dimensional digital representation that accurately corresponds to the 3D shape of the physical object. Based on the captured images, the process may then automatically create a virtual object including its three-dimensional representation.

The captured images of the physical toy construction model may be used as a basis for generating a virtual object having a user-defined appearance in the virtual environment. A user may create a physical toy construction model resembling an object to be used as a virtual object in a computer-generated virtual environment. As the user may construct these objects from toy construction elements, the user has a large degree of freedom as to how the object is constructed. Moreover, the system provides the user with a flexible, yet easy-to understand and easy-to use mechanism for influencing the desired appearance of the virtual object in the virtual environment.

In some embodiments, the scanning station comprises a base. The base may be provided as a separate component to which the object support and/or the sensor device and/or other components may be detachably attached via suitable coupling members of the base. Accordingly, different types of scanning devices and/or object supports and/or other components may be connected to the base, e.g. so as to customise the scanning station to different needs. It is a further advantage that the scanning station may be easily disassembled, e.g. so as to facilitate storage or transport. Alternatively, the sensor device and/or the object support and/or other components may be integrally formed with the base. The base may have the form of a base plate.

In some embodiments, the base comprises an object support coupling member to which the object support can be detachably connected. In particular, when the object support comprises a turntable, the object support coupling member may be configured to receive the turntable such that the turntable is rotatable about an axis of rotation. The base may further comprise one or more coupling members for attaching one or more components of a drive mechanism for driving the turntable. When the drive mechanism is constructible from toy construction elements of the toy construction system, the coupling members for attaching the components of the drive mechanism may be coupling members compatible with the coupling members of the toy construction system. Hence, this allows different types of drive mechanisms to be constructed. For example, the user may replace a manual drive mechanism with a motor-driven drive mechanism.

When the toy construction system comprises two or more object supports that are each selectively and detachably connectable to the object support coupling member, the user may chose different object supports, e.g. object supports of different height, object supports with different configurations of coupling members and/or otherwise suitable for different physical objects and/or compatible with different types of drive mechanisms.

In some embodiments, the base comprises one or more sensor coupling members for receiving the sensor device, e.g. in a predetermined position and orientation relative to the turntable. Accordingly, the sensor device may comprise one or more corresponding mating coupling members for detachably connecting the sensor device to the base, e.g. in a predetermined spatial relation to the object support and with the object support being in a field of view of the sensor device. The sensor coupling member may be compatible with the coupling members of the toy construction elements or a different type of coupling mechanism. For example, the sensor device may be connectable to the base by a ski-boot type coupling a bayonet coupling or another suitable coupling mechanism. In some embodiments, the sensor device may be movably, e.g. rotatably, coupled to the base. To this end, the sensor device may be driven by a drive mechanism which may be constructable from toy construction elements, e.g. as described above in the context of a movable object support.

In some embodiments, the base comprises one or more coupling members for detachably attaching one or more background construction elements configured to form a background portion when observed by the sensor device, e.g. from said predetermined position and orientation defined by a sensor coupling member or by an integrally formed sensor device. For example, background elements of different sizes and/or shapes and/or having different surface properties (such as color or texture) may selectively be connected to the scanning station depending on the desired application. The background may be connectable to the base in a hinged or slidable manner or otherwise movable so as to allow the background portion to be moved between an operational position where it serves as a background and an unloading position where easy access to the object support is facilitated e.g. for positioning or removal of a physical object.

In some embodiments, the base is configured to provide power, in particular electrical power, to one or more components detachably connected to the base. To this end, the base may comprise one or more electrical connectors for connecting mating connectors of a sensor device and/or turntable motor, illumination device, and/or the like. The electrical connector(s) may be separate from coupling members for physically attaching these components to the base, or the electrical connectors may be integrated into the coupling mechanism. Alternatively or additionally to serving as a power supply, the base may include a control unit for controlling the sensor device and/or a turntable drive mechanism and/or an illumination system for illuminating the object to be scanned and/or a background. Alternatively or additionally, the base may be configured to receive the sensor signal from the sensor device and to forward the received sensor signals, optionally after performing one or more signal or data processing steps, to the processor. To this end, the base may comprise said interface configured to transmit a signal indicative of the captured radiation to a processor.

In some embodiments, the scanning station comprises a background portion configured to form a background when observed by the sensor device. The background portion may be formed as an integrated part of the scanning station or it may be formed as one or more separate components that are attachable to e.g. a base of the scanning station. The background portion may define a background surface facing the sensor device. The background surface may have a suitable surface structure and/or color and/or pattern so as to define a predetermined background that is easily detectable by the processor in images captured by the sensor device. In some embodiments, the background portion is shaped and sized so as to define a maximum model volume small enough to be completely captured by the sensor device. For example, the background portion may define a background surface that at least partly surrounds an axis of rotation of the turntable at a radial distance from said axis that defines a maximum dimension of an object to be scanned in the radial direction. In some embodiments, the background portion defines a background surface generally formed as a partial cylinder, e.g. a semi cylinder cut along a longitudinal axis of the cylinder. In some embodiments, the background portion also comprises a top cover which defines a maximum height of the object to be scanned (i.e. along the axis of rotation of the turntable). The maximum dimensions defined by the background portion may be selected in accordance with an operational field of view of the sensor device. In some embodiments, the scanning station may even comprise a housing configured to accommodate the sensor device, the object support and the physical object to be scanned. Such a housing may be removably arranged or configured to be opened so as to allow the object to be placed on and removed from the object support. The housing also defines the background surfaces and may be configured to provide well-defined illumination conditions during the scanning process, e.g. by shielding the object and/or background and/or sensor device against ambient light.

In some embodiments, the scanning station may comprise one or more light sources for illuminating the background surface. The light sources may be powered by the sensor device and/or a base of the scanning station, e.g. via electrical contacts or by providing light sources in the sensor device or base and by feeding light to the background surface via one or more light guides. In some embodiments, the light sources are configured to provide a uniform illumination of the background surface.

In some embodiments, the sensor device comprises at least a lower and an upper imaging device; wherein the upper imaging device is configured to capture one or more images from a viewpoint higher than the viewpoint of the lower imaging device; for example, the lower imaging may be configured to capture one or more images from a viewpoint no higher than an uppermost surface of the object support; the upper imaging device may be configured to capture one or more images from a viewpoint higher than an uppermost surface of the object support and higher than the viewpoint of the lower imaging device. In some embodiments, the sensor device comprises said interface configured to transmit a signal indicative of the captured radiation to a processor. In some embodiments, the sensor device comprises one or more radiation sources, e.g. light sources configured to illuminate an object positioned on the turntable. The light sources may comprise LEDs, flash-lights, or other suitable light sources, such as a laser. The illumination may be broadband illumination e.g. using white light or utilise illumination in selected narrow frequency bands, e.g. selected colors. The illumination may be configured to provide varying illumination of the object, e.g. with different colored light, light of different polarisation states, light of different intensity light from different illumination angles, patterned light, or a combination thereof, e.g. so as to obtain sensor signals under different illumination conditions. Alternatively, the image capturing device may be operable to detect ambient radiation reflected by the object. Here, the term reflection is intended to refer to any type of passive emission responsive to received radiation or waves, including diffuse reflection, refraction, etc. The scanning station may be configured to capture radiation from the object while the object is rotating or while the sensor device is moving, e.g. around the object. Alternatively, the object may be rotated to a number of discrete angular orientations and one or more images may be captured while the object is kept stationary at said discrete angular orientations. Similarly, in some embodiments, the sensor device may be moved to a number of discrete viewpoints and one or more images may be captured while the sensor device is kept stationary at said discrete viewpoints.

The 3D digital representation may be associated with a virtual object in a video game or other form of virtual environment. The various aspects described herein may be implemented with a variety of game systems, e.g. computer-generated virtual environments. Generally, a virtual object may represent a virtual character such as a human-like character, an animal-like character, a fantasy creature, etc. Alternatively, a virtual object may be an inanimate object, such as a building, a vehicle, a plant, a weapon, etc. In some embodiments, virtual objects whose counterparts in the physical world are inanimate, e.g. a car, may be used as an animate virtual character in a virtual environment. Hence, in some embodiments the virtual object is a virtual character and, in some embodiments, the virtual object is an inanimate object.

A virtual character may exhibit behaviour by moving around within the virtual environment, by interacting with or generally engaging other virtual characters and/or with inanimate virtual objects present in the virtual environment and/or with the virtual environment itself and/or by otherwise developing within the virtual environment, e.g. growing, aging, developing or loosing capabilities, attributes or the like. Generally, virtual objects may have attributes, e.g. a capability, that influence the game play or other evolution of a virtual environment. For example, a car may have a certain maximum speed, or an object may have an attribute that determines whether or how a virtual character may interact with the virtual object, and/or the like.

To this end, the processor may be configured to assign virtual attributes, e.g. behavioural attributes such as capabilities, needs, preferences or other attributes of the virtual object, or other game-related attributes to a virtual object, e.g. based on detected visual attributes of the physical object, e.g. by using a mechanism as disclosed in co-pending international patent application PCT/EP2015/062381.

Hence, the processor may be configured to implement a computer-generated virtual environment causing the processor to generate a virtual environment and to simulate the evolution of the virtual environment over time, including the behaviour of one or more virtual characters and/or the attributes of one or more virtual objects within the virtual environment. For the purpose of the present description a computer-generated virtual environment may be persistent, i.e. it may continue to evolve and exist even when no user interacts with it, e.g. between user sessions. In alternative embodiments, the virtual environment may only evolve as long as a user interacts with it, e.g. only during an active user session. A virtual object may be at least partly user-controlled, i.e. the processor may control the behaviour of a virtual object at least partly based on received user inputs. A computer-generated virtual environment may be a single-user environment or a multi-user environment. In a multi-user environment more than one user may interact with the virtual environment concurrently, e.g. by controlling respective virtual characters or other virtual objects in the virtual environment. Computer-generated virtual environments and, in particular, persistent, multi-user environments are sometimes also referred to as virtual worlds. Computer-generated virtual environments are frequently used in game systems, where a user may control one or more virtual characters within the virtual environment. A virtual character controlled by the user is sometimes also referred to as "the player." It will be appreciated that the at least some embodiments of the aspects described herein may also be used in contexts other than game play. Examples of computer-generated virtual environments may include but are not limited to videogames, e.g. games of skill, adventure games, action games, real-time strategy games, role play games, simulation games, etc. or combinations thereof.

In some embodiments, the plurality of toy construction elements comprises one or more marker construction elements attachable to the scanning station and/or to the toy construction model within the field of view of sensor device. The marker construction elements may be configured to be easily recognizable by the sensor device, e.g. by their color, shape, texture, by predetermined insignia, by a signal emitted from the marker construction element and/or the like.

Accordingly, the processor may be configured, based on said signal indicative of the captured radiation, to recognize said one or more marker construction elements, when said one or more marker construction elements are connected to the scanning station or to the toy construction model within the field of view of the sensor device; and to assign one or more attributes to the created 3D digital representation. For example, the marker construction element(s) may define a type of virtual object, e.g. whether the created digital representation should represent a virtual character or an inanimate item, a vehicle, a creature, a non-playable character, etc. The marker construction element(s) may even define the type of character, vehicle, item etc. This information may thus be used by a video game to e.g. determine animation routines, movement patterns, behavioural properties, and/or the like which are to be applied to the created 3D digital representation.

In some embodiments, at least a part of the object support is constructible from said toy construction elements including said marker construction elements. In other embodiments, the system may comprise marker elements that are not connected to the object support or the physical object but otherwise positioned within the field of view of the sensor device, e.g. merely placed on the object support or within a proximity of the object support or on the background.

In some embodiments, the object support is configured such that a model is attachable in different orientations relative to the object support and/or at different positions on the object support. In some embodiments, the different orientations or positions may be detectable by the sensor device, e.g. based on detectable parts of the object support, such as markers. The detected orientation or position may then be used by the processor to assign attributes to the created 3D digital representation, e.g. behavioural attributes such as a direction of motion, team membership, etc.

In some embodiments, the plurality of toy construction elements comprises one or more electronic toy construction elements, each comprising a communications interface for communicating information related to the toy construction element; and wherein system comprises a communication interface configured to receive the communicated information from the electronic toy construction element when the electronic toy construction element is positioned on the object support. The communication interface configured to receive the communicated information may e.g. be comprised in the sensor device, a base of the scanning station or in the processor. The information related to the toy construction element may e.g. be indicative of an attribute to be assigned to the 3D digital representation. The communication may be wireless, e.g. using radio communication, such as via Bluetooth, or via another wireless technology e.g. using infrared or other light, sound and/or the like.

In some embodiments, the scanning station and/or the sensor device and/or the processor comprises a user-perceptible output device operable to provide feedback related to a scanning process, e.g. so as to indicate a progress or success/failure of the scanning process. The output may be a visible output, e.g. using lights or a display, an audible feedback, or a tactile feedback, e.g. a vibration of the turntable.

In some embodiments, the scanning station and/or the sensor device comprises an accelerometer or other sensor operable to detect vibrations of the scanning station during a scanning process, so as to allow detection of conditions that may negatively affect the quality of the resulting scan data. In some embodiments, the system may comprise a detector operable to detect ambient light that may influence the scanning results.

The interface configured to transmit a signal indicative of the captured radiation to a processor may be any suitable wired or wireless communications interface suitable for data communication between the image capture device and a processor. For example, the interface may be a wired, serial interface, e.g. an USB interface. In another embodiment, the interface is a wireless interface, e.g. based on a suitable wireless communications technology such as Bluetooth, Wifi, etc.

Generally, the term processor is intended to comprise any circuit and/or device and/or system suitably adapted to perform the functions described herein. In particular, the above term comprises general- or special-purpose programmable microprocessors, such as a central processing unit (CPU) of a computer or other data processing system, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. The processor may be implemented as a plurality of processing units. The processor may be a processor of a data processing system. The data processing system may comprise a suitably programmed computer such as a portable computer, a tablet computer, a smartphone, a PDA or another programmable computing device having a graphical user-interface. In some embodiments, the data processing system may include a client system, e.g. including a camera and a user interface, and a host system which may create and control the virtual environment. The client and the host system may be connected via a suitable communications network such as the internet.

In some embodiments, the toy construction elements may adhere to a set of constraints, e.g. as regards to their shapes and size and/or as regards the positions and orientations of the coupling members and to the coupling mechanism employed by the coupling members. In some embodiments, at least some of the coupling members are adapted to define a direction of connection and to allow interconnection of each construction element with another construction element in a discrete number of predetermined relative orientations relative to the construction element. Consequently, a large variety of possible building options are available while ensuring interconnectivity of the building elements. The coupling members may be positioned on grid points of a regular grid, and the dimensions of the toy construction elements may be defined as integer multiples of a unit length defined by the regular grid. It will be understood that a three-dimensional grid may be defined by a single unit length, by two unit lengths, e.g. one unit length applicable in two spatial dimensions while the other unit length is applicable in the third spatial dimension. Yet alternatively, the three-dimensional grid may define three unit lengths, one for each spatial dimension. Coupling members consistent with the toy construction system thus adhere to the connectivity rules imposed by the toy construction system, e.g. including the type, position and/or orientation of the coupling members, and they are configured to engage mating coupling elements of one or more of the toy construction elements of the toy construction system.

The present disclosure relates to different aspects including the toy construction system described above and in the following, corresponding apparatus, systems, methods, and/or products, each yielding one or more of the benefits and advantages described in connection with the first mentioned aspect, and each having one or more embodiments corresponding to the embodiments described in connection with the first mentioned aspect and/or disclosed in the appended claims.

In particular, the present disclosure further relates to a toy scanner comprising:

a scanning station comprising an object support for receiving a physical object, in particular a toy construction model constructed from one or more of said toy construction elements;

a sensor device operable to capture radiation from a physical object when the physical object is placed on the object support; wherein the scanning station and/or the sensor device are configured to cause the sensor device to receive radiation at different view points relative to the physical object;

an interface configured to transmit a signal indicative of the captured radiation to a processor for processing the captured radiation and for creating a 3D digital representation of the physical object.

The present disclosure further relates to a scanning station as described above and in the following, the scanning station comprising an object support for receiving a physical object, in particular a toy construction model constructed from one or more of said toy construction elements.

Various embodiments of the toy scanner or the scanning station described herein may also be used for scanning physical objects other than toy construction models constructed from toy construction elements, such as other forms of toys.

The present disclosure further relates to a toy construction set comprising a plurality of toy construction elements, a scanning station, optionally a sensor device, and instructions to obtain a computer program computer program code that causes a data processing system to carry out the steps of an embodiment of one or more of the methods described herein, when the computer program code is executed by the data processing system. For example, the instructions may be provide in the form of an internet address, a reference to an App store, or the like. The toy construction set may even comprise a computer-readable medium having stored thereon such as computer program code. Such a toy construction set may even comprise a camera or other image capturing device connectable to a data processing system.

BRIEF DESCRIPTION OF THE DRAWINGS

FIG. 2A shows a 3D view of the toy scanner, FIG. 2B shows a 3D view of the toy scanner with at toy model attached to the turntable of the toy scanner, FIG. 2C shows an exploded view of the toy scanner and FIG. 2D illustrates attachment and detachment of a toy model to/from the turntable.

FIG. 3A shows a 3D view of the toy scanner and FIG. 3B shows a 3D view of the toy scanner with at toy model attached to the turntable of the toy scanner.

DETAILED DESCRIPTION

Various aspects and embodiments of toy construction systems disclosed herein will now be described with reference to toy construction elements in the form of bricks. However, the invention may be applied to other forms of physical objects, such as other forms of construction elements for use in toy construction sets.

Figure 1:
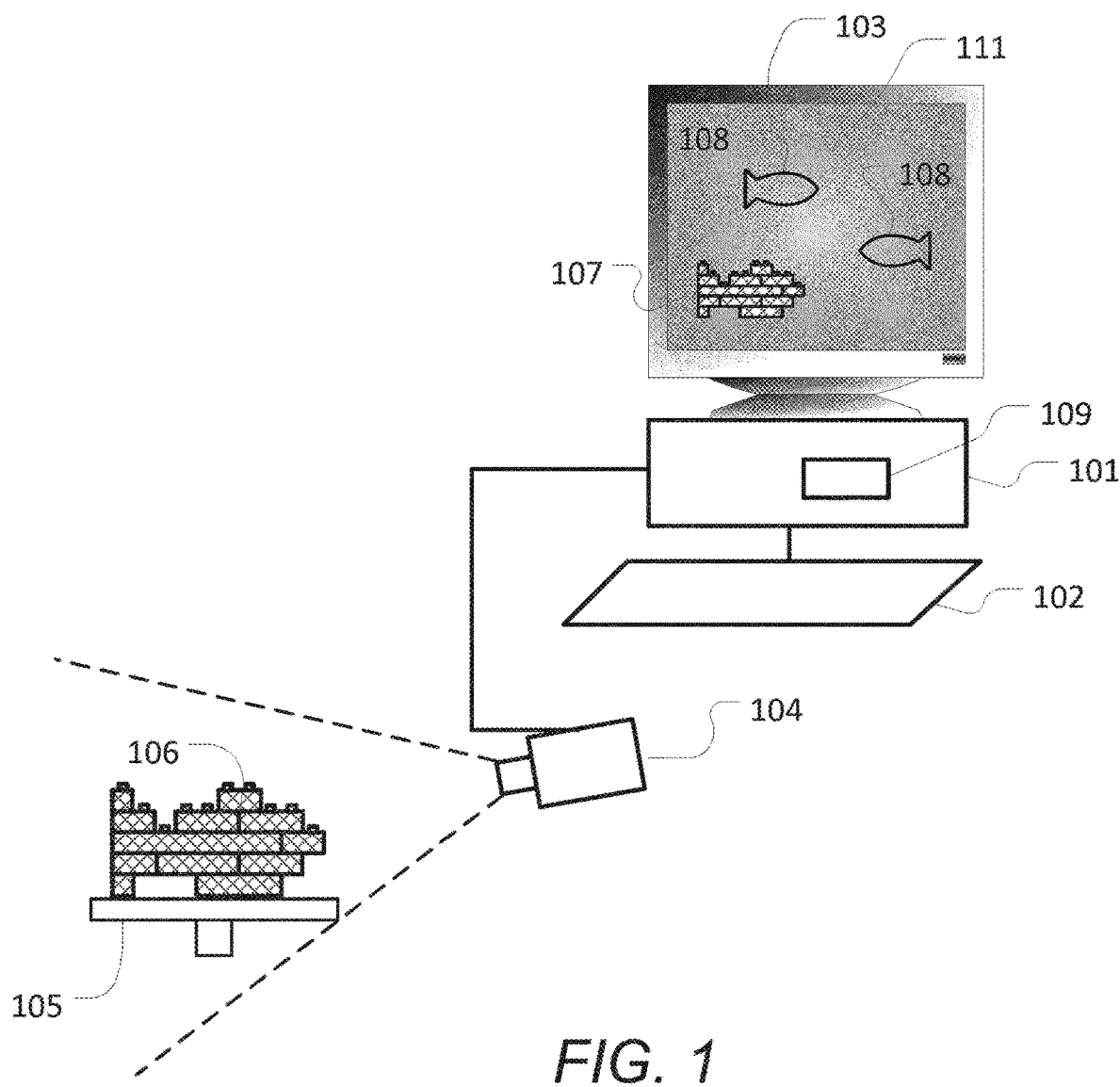
FIG. 1 schematically illustrates an embodiment of a system disclosed herein.

FIG. 1 shows an embodiment of a toy construction system. The system comprises a computer 101, an input device 102, a display 103, a sensor device comprising a camera 104, an object support comprising a turntable 105, and a toy construction model 106 constructed from at least one toy construction element.

The computer 101 may be a personal computer, a desktop computer, a laptop computer, a handheld computer such as a tablet computer, a smartphone or the like, a game console, a handheld entertainment device, or any other suitably programmable computer. The computer 101 comprises a processor 109 such as a Central Processing Unit (CPU) and one or more storage devices such as a memory, a hard disk, and/or the like.

The display 103 is operatively coupled to the computer 101 and the computer 101 is configured to present a graphical representation of a virtual environment 111 on the display 103. Though illustrated as separate functional blocks in FIG. 1, it will be appreciated that the display may be integrated in the housing of the computer.

The input device 102 is operatively coupled to the computer 101 and is configured to receive user inputs. For example, the input device may comprise a keyboard, a mouse, or other pointing device, and/or the like. In some embodiments, the system comprises more than one input device. In some embodiments an input device may be integrated in the computer and/or the display, e.g. in the form of a touch screen. It will be appreciated that the system may comprise further peripheral computer devices operatively coupled to, such as integrated into, the computer.

The camera 104 is operable to capture images of the toy construction model 106 and to forward the captured images to the computer 101. To this end, a user may position the toy construction model 106 on the turntable 105. In some embodiments, the user may construct the toy construction model on top of a base plate. The camera may be a digital camera operable to take digital pictures, e.g. in the form of a two-dimensional array of pixels. In particular, the camera may be configured to capture light intensities for each pixel and additional information such as polarisation information and/or a direction of a surface normal for each pixel or for groups of pixels. Alternatively other types of image capturing devices may be used.

The display 103, the camera 104 and the input device 102 may be operationally coupled to the computer in a variety of ways. For example one or more of the above devices may be coupled to the computer via a suitable wired or wireless input interface of the computer 101, e.g. via a serial or parallel port of the computer such as a USB port, via Bluetooth, Wifi or another suitable wireless communications interface. Alternative, one or all of the devices may be integrated into the computer. For example, the computer may comprise an integrated display and/or input device and/or an integrated camera. In particular, many tablet computers and smartphones comprise an integrated camera, an integrated touch screen operable as a display and input device.

The computer 101 has stored thereon a program, e.g. an App or other software application, adapted to simulate a virtual environment, to process captured images and to create virtual objects as described herein.

It will be appreciated that, in some embodiments, the computer 101 may be communicatively connected to a host system, e.g. via the Internet or another suitable computer network. At least a part of the processing described herein may then be performed by the host system. For example, in some embodiments, a host system may generate and simulate a virtual environment, such as a virtual world which may be accessible by multiple users from respective client computers. A user may use a client computer executing a suitable program to capture an image. The captured image may be processed by the client computer or uploaded to the host system for processing and creation of a corresponding virtual object. The host system may then add the virtual object to the virtual world and control the virtual object within the virtual world as described herein.

In the example, of FIG. 1, the virtual environment 111 is an underwater environment such as a virtual aquarium or other underwater environment. The virtual objects 107, 108 resemble fish or other underwater animals or creatures. In particular, the computer has created one virtual object 107 based on the captured images of the toy construction model 106. The computer has created the virtual object 107 so as to resemble the toy construction model, e.g. by creating a 3D mesh or another suitable form of representation. In the example of FIG. 1, the virtual object 107 resembles the shape and colour of the toy construction model 106. In the present example, the virtual object even resembles the individual toy construction elements from which the toy construction model 106 has been constructed. It will be appreciated, however, that different levels of resemblance may be implemented. For example, in some embodiments, the virtual object may be created so as to resemble only the overall shape of the construction model without simulating its internal structure of individual toy construction elements. The virtual object may also be created to have a size corresponding to the size of the virtual construction element, e.g. by providing a reference length scale on the turntable 105 so as to allow the computer to determine the actual size of the toy construction model. Alternatively, the computer may use the size of the toy construction elements as a reference length scale. In yet alternative embodiments, the user may manually scale the size of the virtual object.

The system illustrated in FIG. 1 may be configured to create a 3D representation of a physical object which may then be used to create a virtual object or character. Generally, in an initial step, the process may capture a plurality of digital images of a toy construction model at respective angular positions of the turntable or otherwise from respective viewpoints.

In subsequent steps, the process may construct a 3D digital representation of the toy construction model from the digital images. To this end, the process may perform one or more image processing steps known per se in the art of digital image processing. For example the processing may comprise one or more of the following steps: background detection, edge detection, colour calibration, colour detection.

The process for generating a 3D digital representation of a physical object from a plurality of captured images may employ any suitable technique known as such in the art of object reconstruction. For example, in one embodiment, the captured images are processed in order to extract:
  Information about the physical scene as seen through the camera
  The turntable position
  An object silhouette In a subsequent step, the silhouettes obtained are projected onto a voxelized volume, that is carved accordingly. Subsequently, a marching cube algorithm is applied to the 3D object obtained from carving. The final mesh is then obtained and the textures cut out from the camera frames are applied on top of that.

Figure 2A:
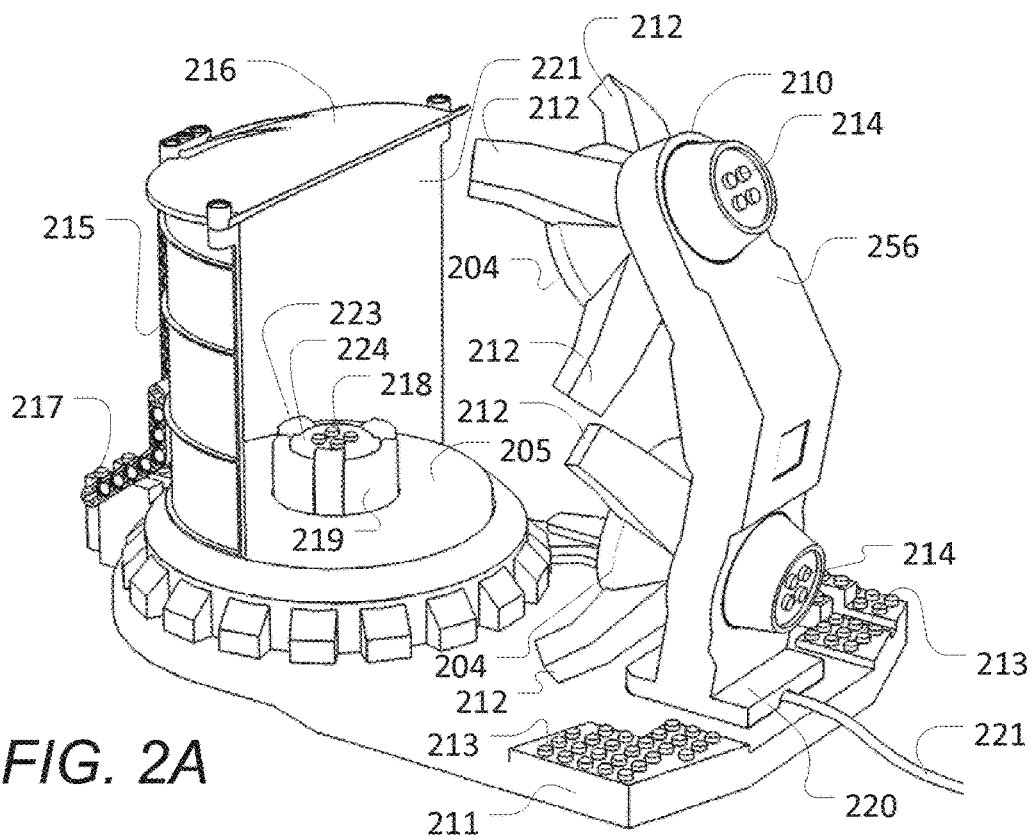
FIGS. 2A-D illustrate an example of a toy scanner. In particular.
Figure 2B:
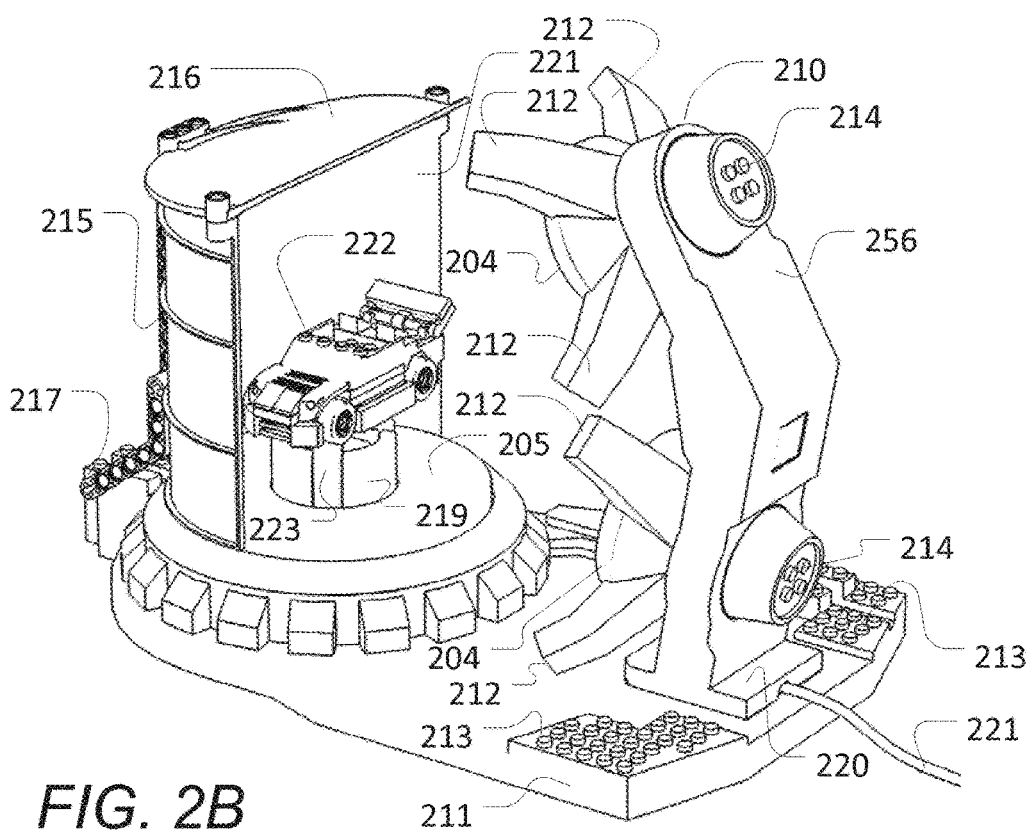
Figure 2C:
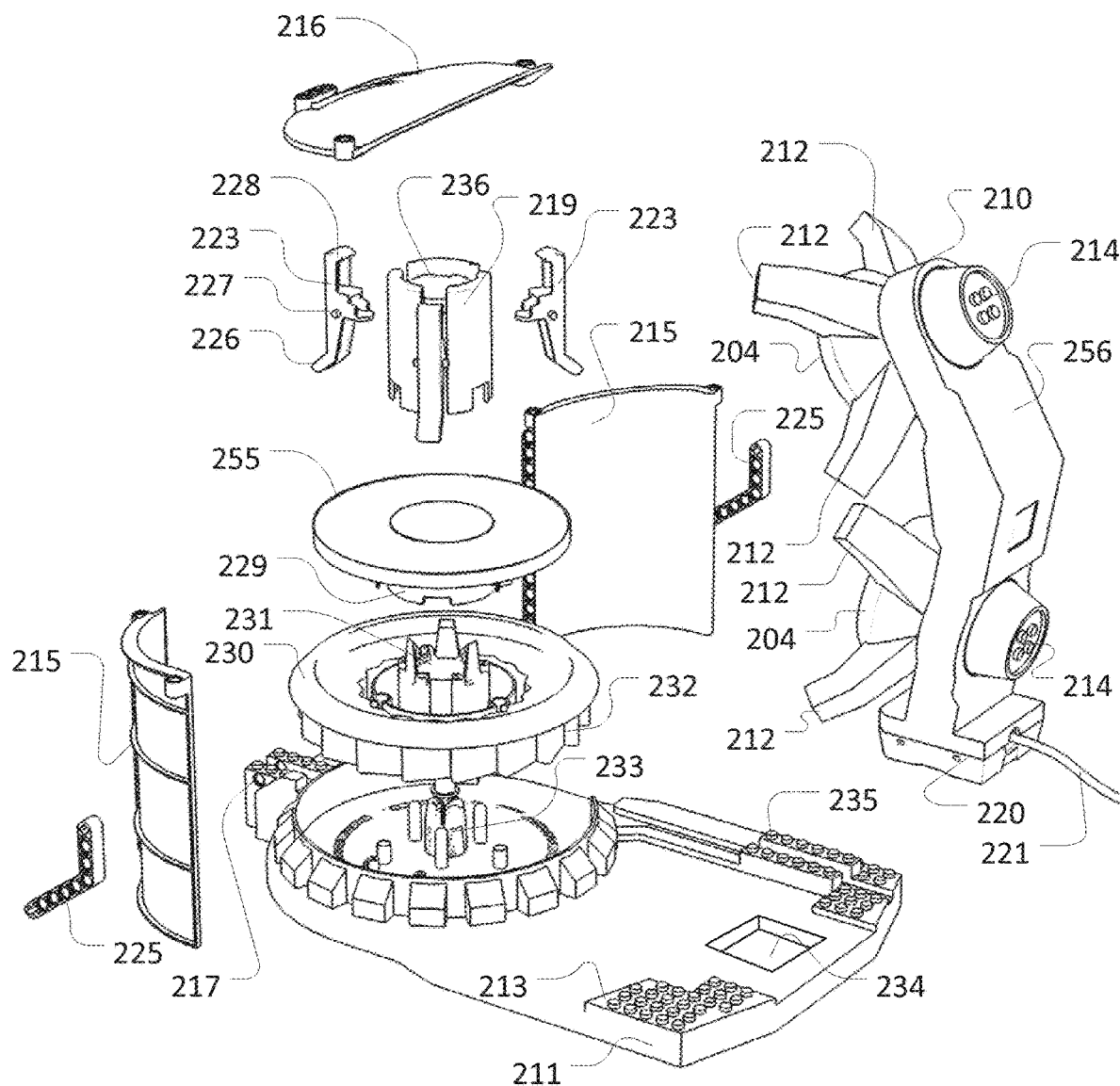
Figure 2D:
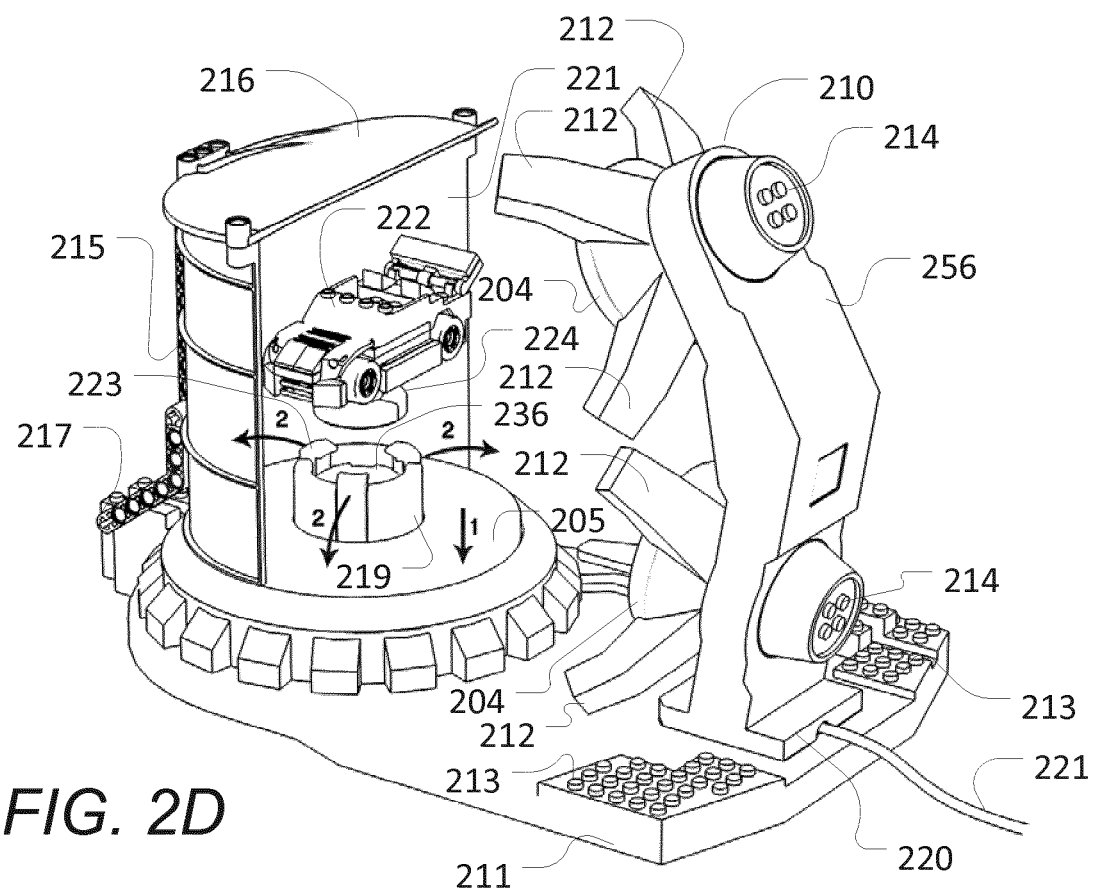

FIGS. 2A-D illustrate an example of a toy scanner. In particular, FIG. 2A shows a 3D view of the toy scanner, FIG. 2B shows a 3D view of the toy scanner with at toy model attached to the turntable of the toy scanner, FIG. 2C shows an exploded view of the toy scanner and FIG. 2D illustrates attachment and detachment of a toy model to/from the turntable.

The scanner comprises a scanning station which includes a base plate 211 and an object support base in the form of a turntable 205 rotatably connected to an upper surface of the base plate 211. The toy scanner further comprises an image capture device 210 that is detachably attached to the upper surface of the base plate. The scanning station further comprises a background portion 215.

The base plate 211 comprises a bearing 233 for receiving the turntable. The base plate further comprises a mounting member 234 for attaching the image capture device 210 to the base plate. The base plate further comprises a hinge connector 217 for movably connecting the background portion to the base plate.

The bearing 233 defines an axis of rotation of the turntable. The axis is preferably normal to the base plate. The mounting member 234 is positioned at a distance from the bearing 233 such that the image capture device 210, when attached to the mounting member, has a field of view including the space extending upwards from the turntable where an object to be scanned is positioned. The mounting member 234 may be formed as a recess for receiving and holding a foot portion 220 of the image capture device. For example, the mounting member may be arranged in a ski-boot fashion or using another suitable fastening mechanism.

The hinge connector is positioned on a side of the bearing that faces away from the mounting member, such that the background portion 215 is mountable on the side of the turntable opposite the side on which the image capture device is located. The background portion 215 comprises two wall parts that are connectable to each other so as to form a semi-cylinder whose longitudinal axis, when the background portion is mounted to the baseplate extends parallel, e.g. coaxial, with the axis of rotation of the turntable. The wall portions are hingedly connected via bars 225 to the hinge connector such that the background portion can be tilted between an upright, operational position and a reclined position which allows easy access for a user to place an object on the turntable or to remove an object from the turntable. When positioned in its upright, operation position, the background portion defines a background surface such that an object that is placed on the turntable is viewed by the image capture device in front of the background surface. To this end, the background surface is shaped and sized so as to fill out a sufficiently large part of, e.g. the whole, field of view of the image capture device. In some embodiments, the background surface may have at least one property, e.g. color, pattern, texture, polarisation properties, or the like, that allows the image capture device to detect the background portion and/or to distinguish an object from the background in an image captured by the background portion. The background portion further comprises a roof part 216 such that the background portion defines a semi-enclosure around an object on the turntable.

In addition to providing a well-defined background, the background portion also defines a maximum volume of an object that can be placed on the turntable and scanned by the toy scanner. In particular, the wall portions defined a maximum width/radial extent (relative to the axis of rotation of the turntable) and the roof defines a maximum height/axial extent of an object.

The turntable 205 comprises a rotatable drive member 230, a cover member 255 and a supporting stand 219. The cover member and the supporting stand are attachable to the drive member 230 such that they rotate together with the drive member. The drive member 230 is configured to rotatably rest on the bearing 233 of the base plate. The drive member comprises a downwardly projecting skirt 232 which has a toothed outer circumference configured to engage with a drive mechanism for rotating the drive member relative to the base plate. It will be appreciated, however, that the turntable may comprise alternative drive elements configured to engage with a drive mechanism for driving the turntable.

The supporting stand 219 comprises a cylindrical body having a lower end that is fixedly connectable to a corresponding connecting element 231 of the drive member. The supporting stand defines at its upper end an upwardly open recess 236 for receiving a support element 224, e.g. a foot portion of a pedestal. The supporting stand further comprises locking members 223 that are pivotably connected along a circumference of the supporting stand. To this end, the locking members have an axle portion 227 or other pivotable mounting member. Each locking member has a locking end 228 arranged to lock an object support element 224 in place when the object support element is received in the recess. To this end, the locking member is biased radially inwards in a locking engagement. The locking member may comprise an upwardly facing cam surface configured to cause the locking end to be pushed radially outward when an object support element is pressed downward into the recess 236.

The cover member 255 is formed as an annular member defining an upward facing annular top surface of the turntable. The annular member 255 has a central hole through which the supporting stand 219 extends upwards such that the recess 236 is elevated above the annular top surface of the cover member. The cover member is axially slidable relative to the supporting stand 219 and comprises a skirt 290 configured to engage radially outward and downward extending engagement ends 226 of the locking members, the engagement ends being position at an end of the locking member opposite the locking end. The cover member is spring biased in an upper position but can be pushed downwards by a user by pressing the top surface downwards. When the cover member 255 is pushed downwards (e.g. as illustrated by the arrow marked "1" in FIG. 2D) pushed downwards, the skirt 229 engages the engagement ends 226 and forces them radially inwards which in turn causes the locking ends to move radially outward so as to release an object support element 224 from the recess 236 (e.g. as illustrated by the arrows marked "2" in FIG. 2D). Hence, an object to be scanned that is mounted on, or integrally formed with, a suitable object support element may be easily positioned centrally on the turntable and is secured on the turntable against tilting and vibration during the scanning process. Moreover, the object may easily be removed from the turntable regardless of the angular position of the turntable.

FIG. 2A shows the scanner with an object support element 224 positioned in the recess 236 and retained by the locking members 223. In this example, the object support element is a disc-shaped base plate which has coupling members 218 arranged on its upper surface. The coupling members are compatible with the coupling members of the toy construction system so as to allow one or more toy construction elements of the toy construction system to be attached to the base plate 224. For example, an object 222 to be scanned can be directly attached to the base plate 224. Alternatively a pedestal can be constructed from one or more toy construction elements such that the base plate 224 is a foot portion of the pedestal and the object 222 to be scanned is attached to a top end of the pedestal. Hence, the object support element may be form by the base plate 224 alone or by the base plate and one or more additional toy construction elements. In any event, the object to be scanned with its object support element can be securely positioned and held by the supporting stand 219.

The object 222 is a toy construction model constructed from toy construction elements that comprise coupling members for detachably interconnecting the toy construction elements with each other. The coupling members may be based on a frictional engagement of corresponding coupling members of two toy construction elements; other examples of coupling members may be based on another type of interlocking mechanism. In one particular example, the coupling members comprise protrusions and cavities such that one or more protrusions of one toy construction element engage in frictional engagement with a cavity of another construction element. It will be appreciated that a toy construction system may comprise different types of coupling members. Typically, the construction members are configured such that they can only engage other construction members that are compatible with the toy construction system. The coupling members may further impose a set of restrictions as to how construction elements can be interconnected with each other, e.g. only at a predetermined set of relative positions and/or orientations. Coupling members may thus be compatible with the toy construction system only if they adhere to the restrictions imposed by the toy construction system, e.g. as regards the type, shape, size, position and orientation of the individual coupling members.

It will be appreciated that the turntable may comprise alternative or additional retaining members for receiving and holding an object to be scanned. For example, the turntable may comprise a recess and radially slidable locking elements that may be slid radially inward so as to extend above at least an edge of a foot portion of an object support element. Other examples of retaining members may include elastic locking members that are biased radially inward so as to engage a foot portion of an object support element. In yet other embodiments, the supporting stand 219 may comprise coupling members compatible with the toy construction system, e.g. as described in connection with FIGS. 3A-B.

The image capture device 210 comprises an elongated body portion 256. At a lower end of the body portion a foot portion 220. The image capture device comprises two cameras 204, one of which is positioned proximal to the foot portion while the other camera is positioned proximal to an upper end of the body portion. Both cameras are arranged to face the space above the turntable, i.e. such that the space occupied by an object placed on the turntable is within the field of view of each of the cameras with the background portion 215 including the roof part 216 forming a background within the field of view of each camera. The cameras are positioned and oriented such that their respective viewpoints are at different heights relative to the top recess 236 of the supporting stand 219 and relative to an object positioned on the supporting stand. In particular, the lower camera may be located at a height corresponding to the upper end of the supporting stand, e.g. no higher than the upper end of the supporting stand. The upper camera may be positioned above the upper end of the supporting stand e.g. at a height corresponding to the height of the roof part 216, such that the upper camera can capture an uppermost portion of an object positioned on the turntable without being obstructed by the roof portion. To this end the upper camera is directed facing slightly downward while the lower camera faces slight upward.

The image capture device 210 further comprises a number of light sources 212 configured to illuminate an object positioned on the turntable. In the present embodiment, the light sources comprise LEDs emitting generally white light. However, other forms of light sources may be used, e.g. colored light sources and or light sources emitting polarised light, e.g. so as to suppress undesired reflections from the object, patterned light, or a combination thereof. In the embodiment of FIGS. 2A-D, the image capture device comprises two sets of light sources. The light sources of each set are distributed around a respective one of the cameras and displaced along different radial directions from an optical axis of the corresponding camera, i.e. such that different light sources illuminate the object from different angles relative to the optical axis of the corresponding camera. In some embodiments, the image capturing device may be configured to capture images with all light sources turned on; while, in other embodiments, the image capture device may be configured to capture multiple images of the object from the same point of view relative to the object (i.e. at the same angular position of the turntable), but with only respective ones of the light sources turned on. In such an embodiment, surface orientations of the surfaces of the object may be estimated from the reflected light intensities in response to illumination from different angles. In yet other embodiments, the image capture device may be configured to capture multiple images from the same point of view relative to the object but with different illumination conditions, e.g. different illumination angles, colors, and/or polarisation properties of the illuminating light.

The image capture device 210 comprises coupling members 214 configured for attaching toy construction elements of the toy construction system, e.g. to attach decorative parts and/or in order to attach additional light sources and/or cameras and/or components of a drive mechanism for driving the turntable. The coupling members 214 are located on a side of the body portion different from the side where the cameras 204 and the light sources 212 are positioned, i.e. on a side facing away from the turntable. Accordingly, any toy construction elements coupled to the coupling members are not likely to obstruct the field of view of the cameras or the illumination by the light sources.

Similarly, in addition to the couplings for attaching the background portion, the turntable 205 and the image capture device, the base plate 211 comprises further coupling members 213 configured for attaching toy construction elements of the toy construction system, e.g. so as to allow attachment of decorative parts and/or in order to attach additional light sources and/or cameras and/or components of a drive mechanism for driving the turntable. The coupling members 213 are located on the top surface of the base plate. However alternatively or additionally, the base plate may comprise coupling members along the edges of the base plate. In the present example, all such coupling members 213 are positioned outside the field of view of the cameras 204 and such that toy construction elements attached to the coupling members 213 are not likely to obstruct the field of view of the cameras or the illumination by the light sources.

The turntable 205 may be driven by a manual drive mechanism, e.g. manually operated by a lever, a crank or other suitable activation member for imparting a physical force. Alternatively or additionally, the turntable may be driven by a motor or the like. Components of the drive mechanism may be integrated into the base plate 211 and/or the image capture device 210 and/or connected to the base plate and/or the image capture device, e.g. via the coupling members 213 and/or 214. Examples of drive mechanisms will be described in more detail in connection with FIGS. 9, 10, 11A and 11B.

In the embodiment of FIGS. 2A-D, the image capture device comprises a cable 221 for connecting the image capture device to a computer, a game console, a tablet or another data processing device. Hence, the image capture device may receive electrical power and/or control signals for controlling operation of the image capture device from an external data processing device. Similarly, the image capture device may transmit data indicative of the captured images to the data processing device via cable 221. Nevertheless, in some embodiments, the base plate 211 and/or the image capture device 210 may comprise a power source such as a battery or an electrical connector for connecting an external power source for supplying power to the cameras, the light sources and/or a motor for driving the turntable. In some embodiments, the base plate 211 and/or the image capture device 210 may comprise control circuitry for controlling operation of the cameras, the light sources and/or a motor for driving the turntable. It will also be appreciated that the toy scanner may alternatively or additionally be connectable to a data processing device via a wireless interface, such as Wifi, Bluetooth or the like.

Figure 3A:
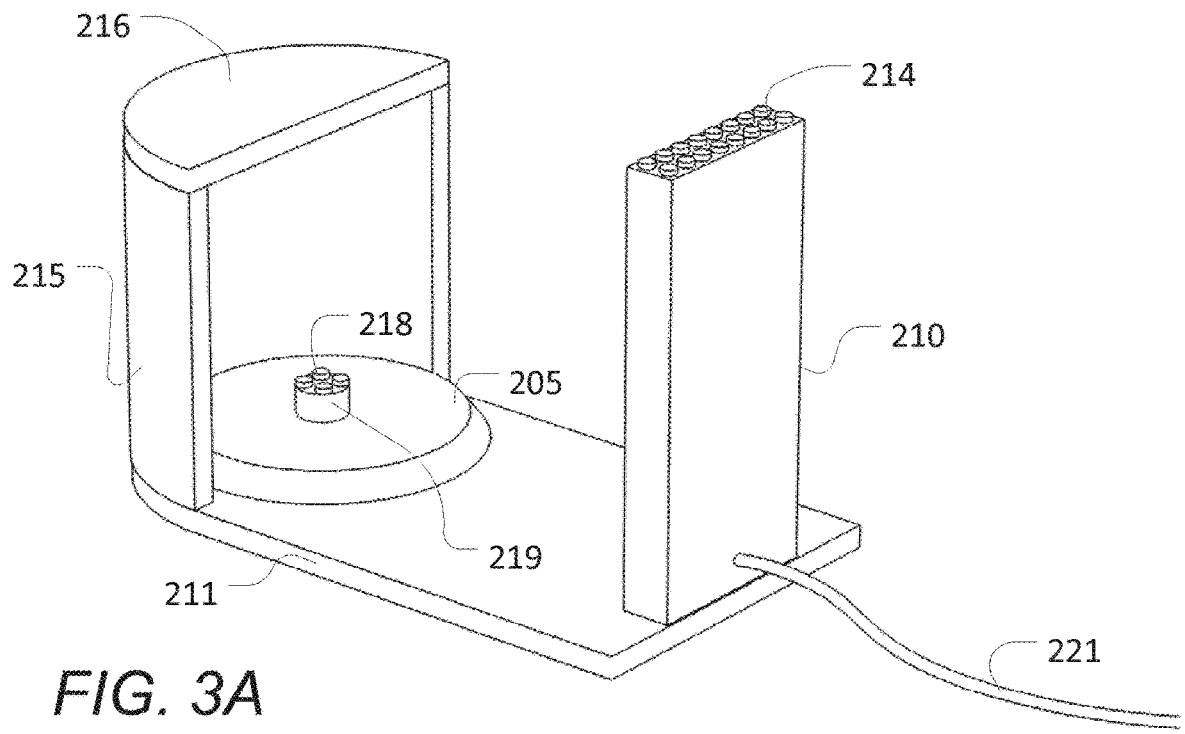
FIGS. 3A-B illustrate another example of a toy scanner. In particular.
Figure 3B:
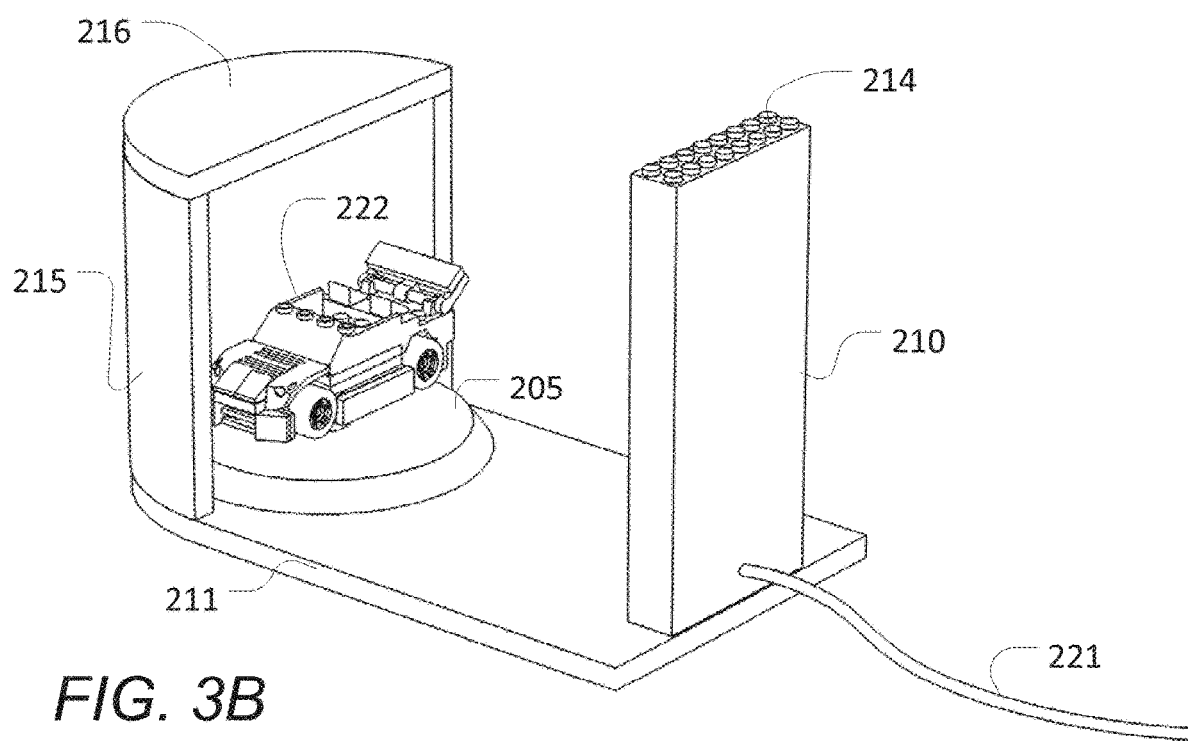

FIGS. 3A-B schematically illustrate another example of a toy scanner. In particular, FIG. 3A shows a 3D view of the toy scanner and FIG. 3B shows a 3D view of the toy scanner with at toy model attached to the turntable of the toy scanner. The toy scanner shown in FIGS. 3A-B is similar to the toy scanner described in connection with FIGS. 2A-D and comprises a base plate 211, a turntable 205 arranged on the base plate, an image capture devise 210 and a background portion 215 including a roof part 216. The background portion and/or the turntable and/or the image capture device 210 may be detachably connectable to the base plate by means of corresponding coupling members of the base plate, e.g. as described in connection with FIGS. 2A-D. Alternatively, the background portion and/or the turntable and/or the image capture device may be integrally formed with or permanently connected to the base plate.

The background portion and/or the image capture device may be of the type described in greater detail in connection with FIGS. 2A-D. For example, the background portion may be hingedly attached or otherwise movably attached to the base plate and the image capture device may comprise one, two or even more cameras and, optionally, one or more light sources, e.g. as described in connection with FIG. 2A-D. Also, the image capture device and/or the base plate may comprise coupling members 214 for attaching toy construction elements of the toy construction system, and the image capture device and/or the base plate may comprise a wired interface 221 or other form of interface for communicating with a data processing device and/or for receiving electrical power from the data processing device.

In the example of FIGS. 3A-B, the turntable 205 comprises a supporting stand 219 extending upwards relative to a top surface of the turntable so as to provide a raised support for receiving an object 222 to be scanned. In the example of FIGS. 3A-B, the supporting stand 219 comprises coupling members 218 on its uppermost surface that are compatible with the toy construction system, i.e. which are configured for attaching toy construction elements of the toy construction system to the upper end of the supporting stand.

Figure 4:
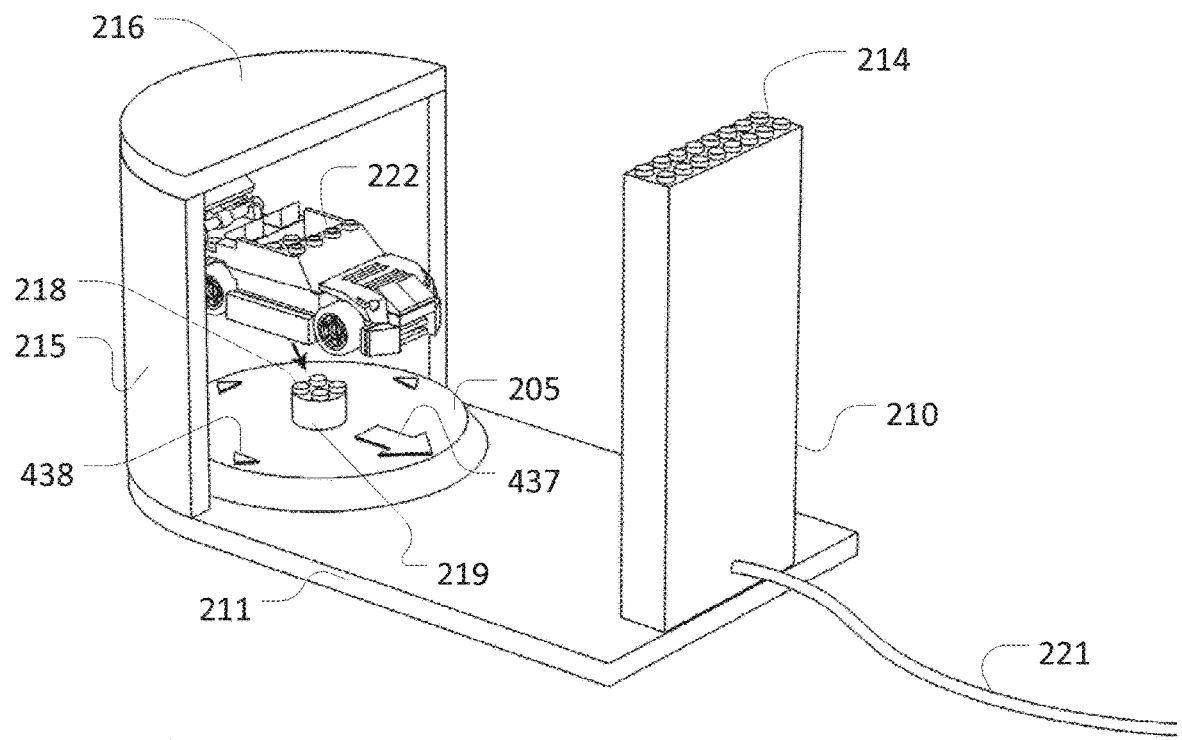
FIGS. 4-8 show further embodiments of a toy scanner.

FIG. 4 shows another embodiment of a toy scanner. The toy scanner of FIG. 4 is similar to the toy scanner of FIGS. 3A-B but comprises markers 437 and 438 printed or attached to the turntable. In the example FIG. 4, the markers are positioned on a top surface of the turntable while, in other embodiments, the markers may be positioned along a skirt or rim of the turntable. The markers are positioned such that they are within the field of view of the image capture device 210, at least at one or some selected angular orientations of the turntable. The markers are also visible to the user when the user places the object to be scanned on the turntable. In the present example, at least one marker 437 represents a default direction of the object to be scanned, e.g. a front side, a direction of movement, a direction of interaction, or the like. Accordingly, the user may position the object to be scanned on the turntable such that the side of the object which is intended by the user to represent a front side, a direction of movement, a direction of interaction, or the like faces the corresponding marker 437. During the scanning process, the image capture device thus captures the position of the marker 437 relative to the object 222 and the data processing device processing the captured images so as to create a 3D digital representation may detect the position of marker 437 relative to the object 222 and thus assign a corresponding attribute to the created 3D digital representation indicative of which direction of the created 3D representation represents a front side, a direction of movement, a direction of interaction, or the like.

It will be appreciated that the turntable, the background portion and/or the base plate may be provided with other forms of markers that are detectable by the image capture device and which can be interpreted by the data processing system when creating the 3D digital representation. The detected markers may thus be used to assign one or more attributes to the created 3D digital representation responsive to the detected markers.

Figure 5:
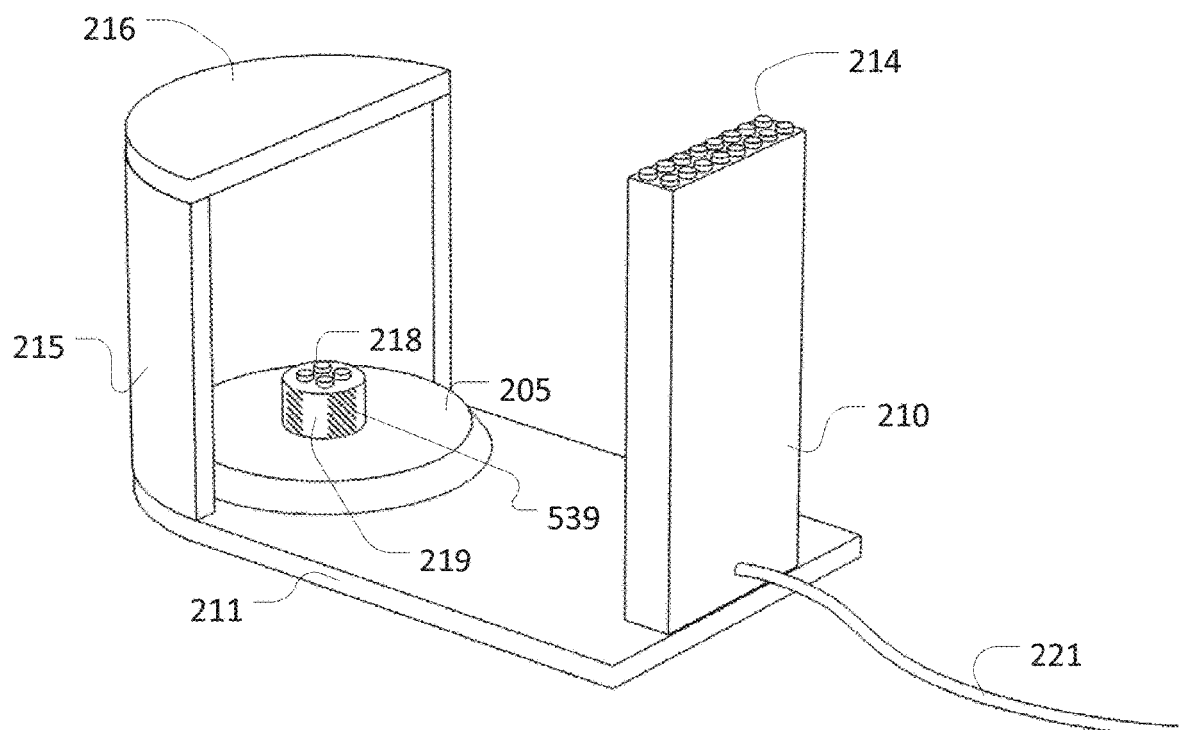

FIG. 5 shows another embodiment of a toy scanner. The toy scanner of FIG. 5 is similar to the toy scanner of FIGS. 3A-B and 4 but where the supporting stand comprises one or more markers 539 or another form of marker, e.g. in the form of a feature that is detectable by the image capture device, e.g. a special color, surface texture or the like. Accordingly, the data processing system may detect the supporting stand in the captured images and distinguish the supporting stand from the object to be scanned. This may be particularly useful when the supporting stand 219 and/or the entire turntable is replaceable or otherwise reconfigurable. For example, a system may comprise multiple supporting stands of different dimensions, e.g. different heights, and/or with different types and/or configurations of coupling members. The user may thus selectively attach one of the supporting stands to the turntable or one of multiple turntables to the base plate depending on the type of object to be scanned. If the supporting stand is configured such that the data processing system can distinguish the supporting stand from the object to be scanned, a more accurate creation of the 3D representation is provided. Alternatively or additionally, the object stand may itself be constructible from toy construction elements of the toy construction system, e.g. by stacking one, two or more toy construction elements on top of another so as to create a stand of a desired height.

Figure 6:
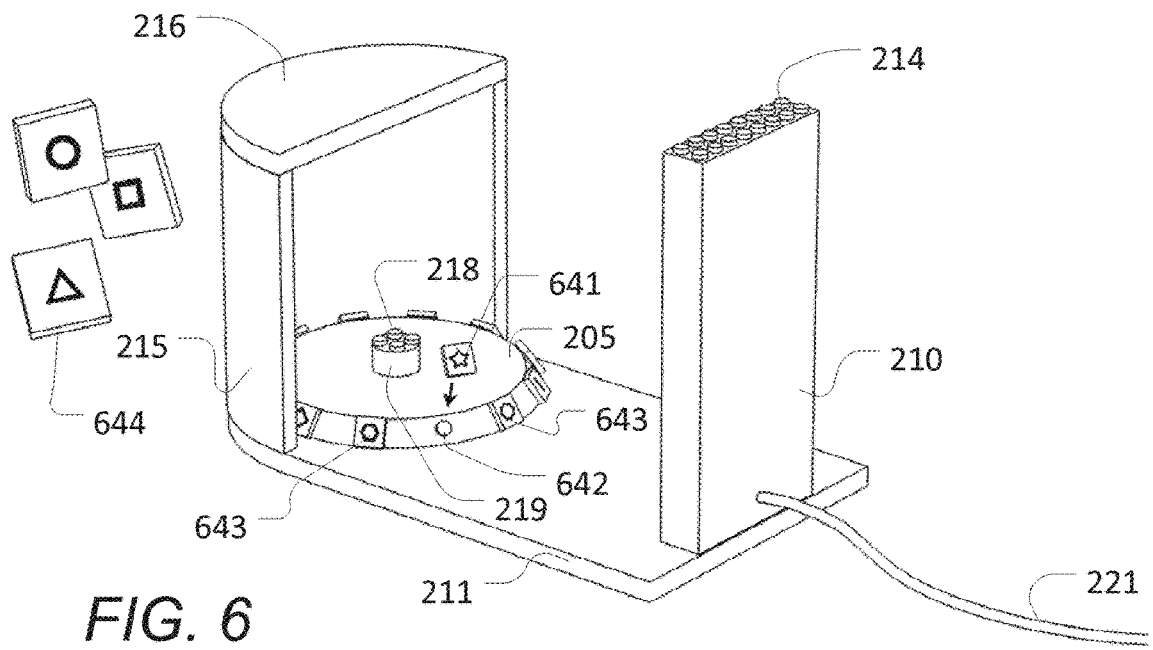

FIG. 6 shows another embodiment of a toy scanner. The toy scanner of FIG. 6 is similar to the toy scanner of FIGS. 3A-B, 4 and 5 but where the turntable comprises coupling members 642, e.g. coupling members compatible with the toy construction system, configured to allow attachment of marker tiles 641, 644 or other forms of marker construction elements. The marker tiles comprise a rear side having a mating coupling member configured to be connected with the coupling members 642 of the turntable. The marker tiles further comprise a front side, which is visible when the marker tile is connected to the turntable and which comprises a marker—e.g. a predetermined color, insignia, pattern or the like—that is can be captured by the image capture device and detected and identified by the data processing system creating the 3D digital representation from the captured images. Hence, a user may attach one or more selected marker tiles to the turntable such that they are captured during the scanning process. The data processing system may then detect and identify the markers and assign corresponding one or more attributes to the created 3D representation of the scanned object. Examples of such attributes may e.g. relate to a type of virtual object to be created, e.g. a car, a plane, a truck, etc., or to one or more capabilities of the created virtual object, e.g. a maximum speed, a capacity, a power, etc.

In the example of FIG. 6, the tiles are attachable to a rim of the turntable. However, it will be appreciated that the tiles may be attachable to a top surface of the turntable or at other places within the field of view of the image capture device, e.g. to the background, the base plate or even to the object to be scanned. It will further be appreciated that the marker construction element may have a form different from tiles. In some embodiments, the shape and size of the marker construction elements may differ from another; in fact, the shape and/or size may even be a part of the detectable property of the marker. In some embodiments, the marker construction elements may be attachable by other means than coupling members but e.g. by an adhesive. For example, in one embodiment, the marker elements may be provided as adhesive stickers that can be removably and, preferably, repeatedly be attached to the turntable or other part of the toy scanner or object to be scanned.

Figure 7:
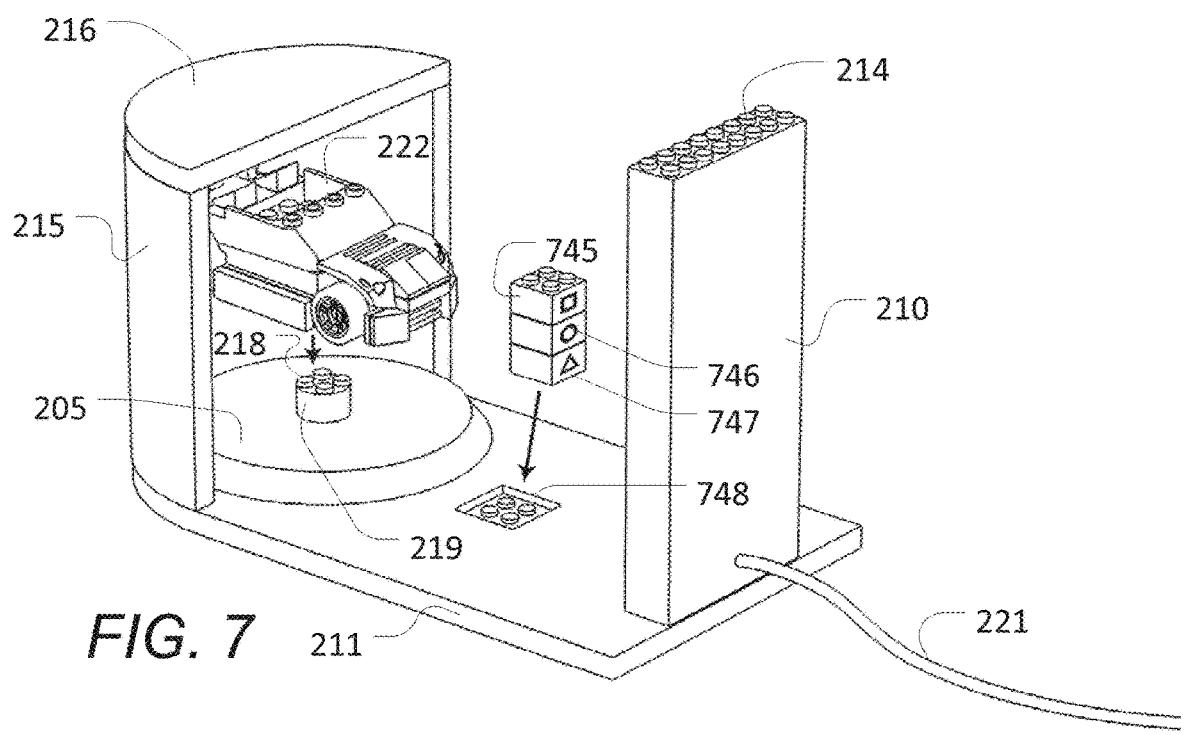

FIG. 7 illustrates an example where marker construction elements 745, 746 and 747 are connectable to the base plate within the field of view of the image capture device. To this end, the base plate 211 comprises coupling members 748 to which marker construction elements 745, 746 and 747 can be connected, e.g. by stacking the marker construction elements on top of each other as illustrated in FIG. 7. Each marker construction elements has a visible marker on at least one of its surfaces, such that the image capture device can detect the combination of markers when scanning the object 222.

Figure 8:
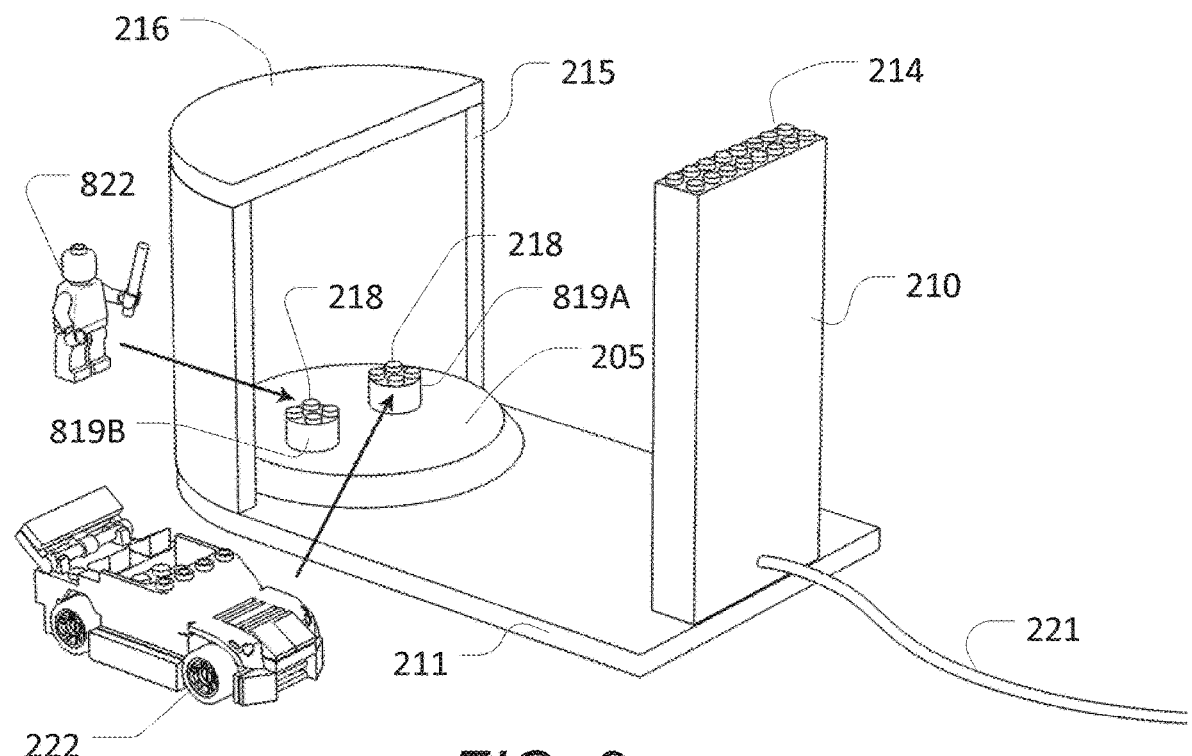

FIG. 8 shows another embodiment of a toy scanner. The toy scanner of FIG. 8 is similar to the toy scanner of FIG. 3A-B or 4-6 but where the turntable comprises two separate supporting stands 819A and 819B, each having coupling members 218 on its top surface. Accordingly, the scanner of FIG. 8 allows two objects 222 and 822 to be positioned on and connected to the turntable such that both objects can be scanned at the same time. The data processing system may then create separate 3D representations or a combined representation. For example, in the example of FIG. 8, a car and a figurine are attached to the turntable. Responsive to the scanning of the figurine and the car, the data processing system may create a combined virtual object where a character having the appearance of the figure is the driver of a car that has the appearance of the scanned car. It will be appreciated that, in other examples, the data processing system creating the 3D representation may create other forms of relationships between the 3D representations and/ or between corresponding virtual objects. The form of relationship may e.g. depend on the type of objects and/or on their respective positions on the turntable. Alternatively, the relationship may be determined by other factors, e.g. game events of the video game and/or user input. In some embodiments, the relationship may at least in part be determined by markers, e.g. marker construction elements scanned with the objects, e.g. using and embodiment of a scanner as described in connection with FIG. 4 or 5 where the turntable can accommodate two or more objects. In the example of FIG. 8, the turntable comprises supporting stands for two objects; it will be appreciated that other examples of turntables may comprise supporting stands for three or more objects. In yet other embodiments, a turntable may comprise one or more stands or supports platforms that each can accommodate more than one object.

Figure 9:
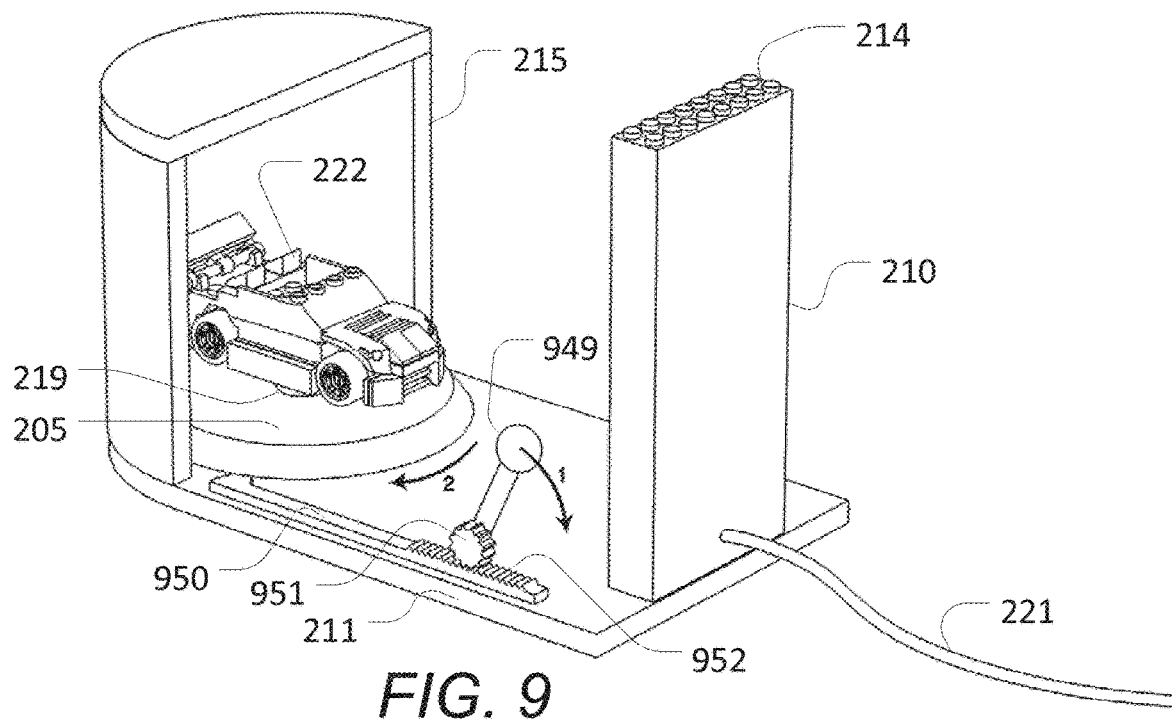
FIGS. 9-10 illustrate different examples of drive mechanism for manually driving the turntable of a toy scanner.
Figure 10:
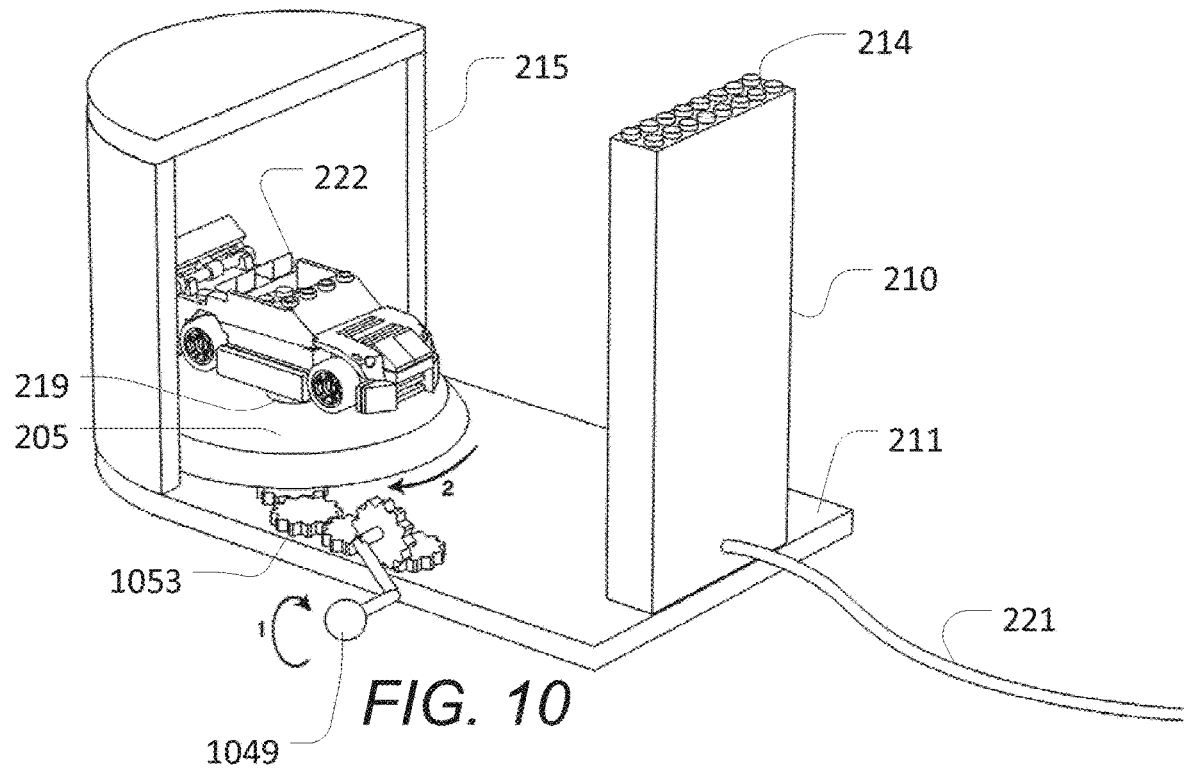

FIGS. 9-10 illustrate different examples of drive mechanism for manually driving the turntable of a toy scanner. In particular, FIGS. 9-10 show examples of a toy scanner similar to the toy scanner of FIG. 3A-B or 4-8 where the turntable is driven by a manual drive mechanism. In the example of FIG. 9, the drive mechanism comprises a lever 949 that can be pivoted back and forth (as indicated by arrow "1" in FIG. 9). The pivoting movement of lever 949 is translated by a pinion 951 to a linear reciprocating motion of a rack 950, the rack engages the turntable and causes the turntable to rotate, as illustrated by arrow "2" in FIG. 8.

FIG. 10 shows an example of a drive mechanism where the user operates a crank 1040 whose rotation is translated via a set of gear wheels 1053 into a rotation of the turntable 250.

In the examples of FIGS. 9 and 10, the components of the drive mechanism may be toy construction elements of the toy construction system that may be connected to the base plate 211 via the coupling members of the toy construction system, e.g. as described in connection with FIGS. 2A-D.

Figure 11A:
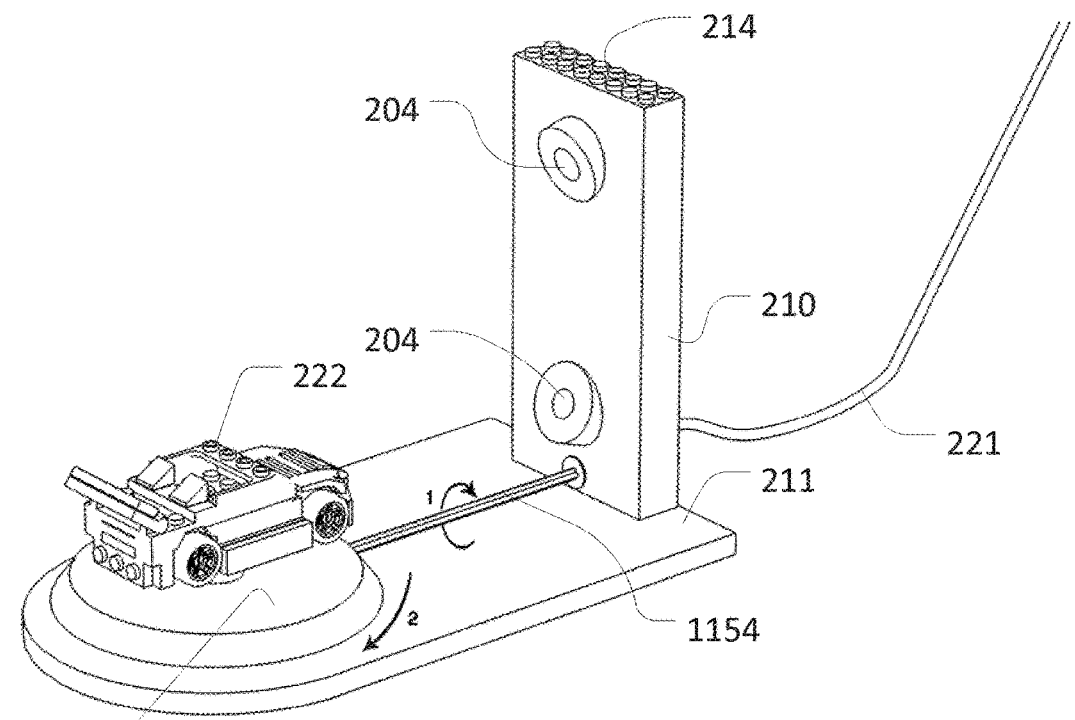
FIGS. 11A-B illustrate examples of a toy scanner having a motor-driven turntable.
Figure 11B:
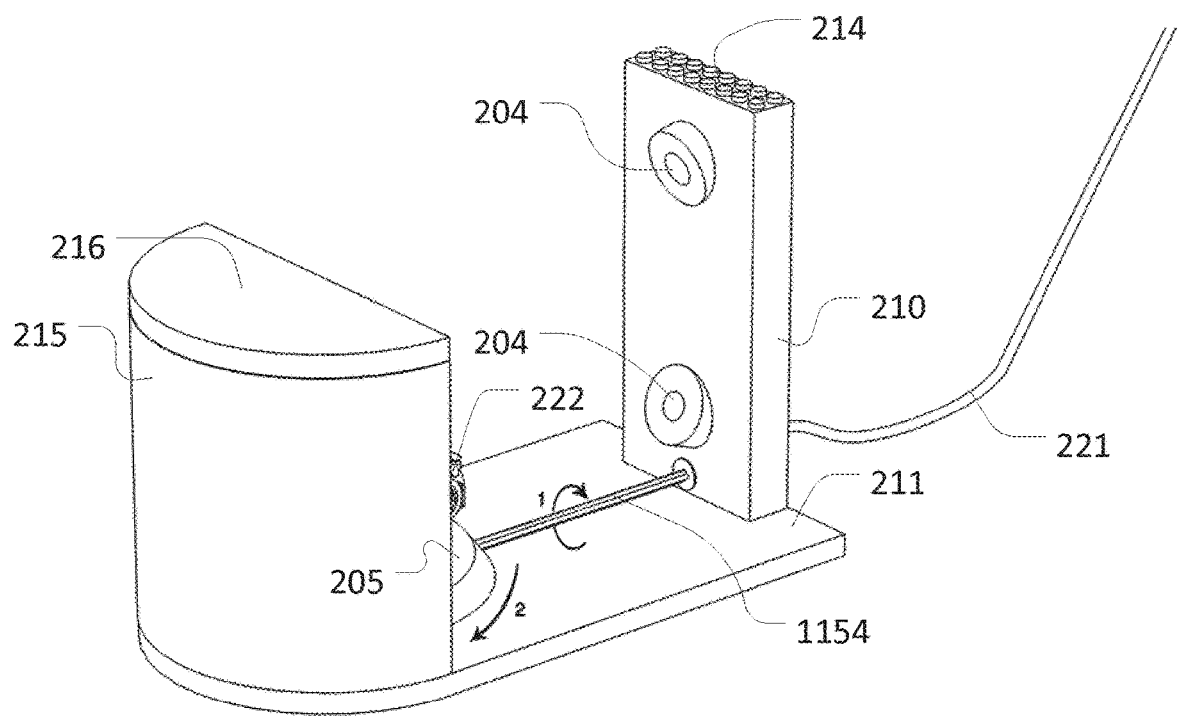

FIGS. 11A-B illustrate an example of a toy scanner having a motor-driven turntable. In particular, FIGS. 11A-B show an example of a toy scanner similar to the toy scanner of FIG. 3A-B or 4-8 where the image capture device 210 comprises an electrical motor driving an axle 1154 that extends from the image capture device to the turntable and is configured to drive the turntable. FIG. 11A shows the scanner without the background portion while FIG. 11B shows the scanner with the background portion 215 attached to the base plate. In the example of FIGS. A-B, the motor is integrated into the image capture device such that the image capture device is the only component that requires electrical power. It will be appreciated, however, that, in other embodiments, the motor may be integrated into the base plate or the turntable or provided as a separate component, e.g. as a toy construction element that is connectable to the base plate and that comprises a motor.

It will further be appreciated that, in general, the turntable may be configured to be rotated in a continuous motion such that the image capture device captures images while the turntable rotates. In other embodiments, the turntable may be configured to rotate in discrete angular intervals and remain stationary at respective angular positions such that the image capture device may capture one or more images at each of the respective angular position while the turntable remains stationary.

Figure 12:
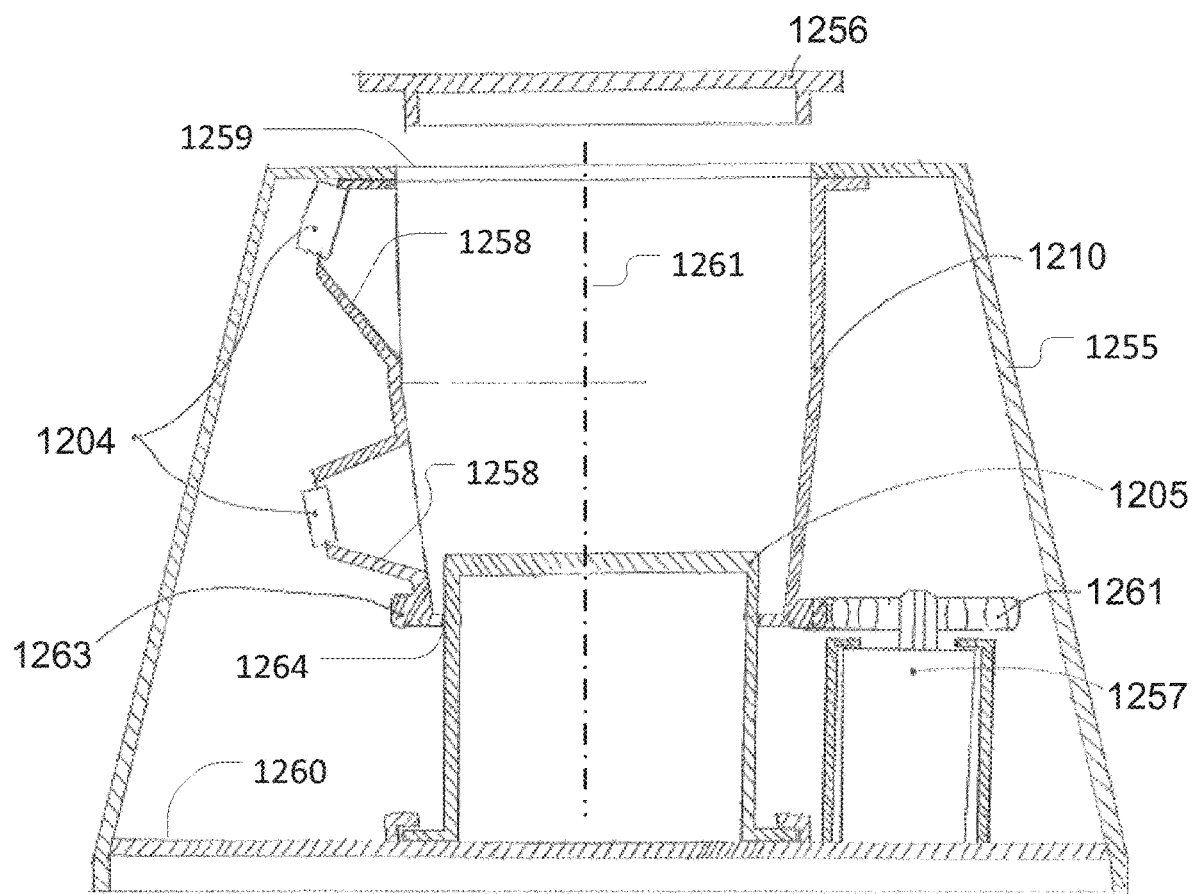
FIG. 12 illustrates another example of a toy scanner.

FIG. 12 illustrates another example of a toy scanner. The toy scanner comprises a base plate 1260, a housing 1255, an object support platform 1205, a rotatable member 1210, two cameras 1204, a lid 1256 and a motor 1257.

The housing defines an enclosure for accommodating the object support platform 1205, the motor 1257 and the rotatable member 1210. In this embodiment, the housing is a dome or box-shaped member extending upwards from the base plate. It will be appreciated, however, that alternative embodiments of a scanner may comprise one or more of the components arranged outside the housing. For example, some embodiments may include a motor or other drive mechanism that is arranged outside the housing and operationally connected to the rotatable member by a suitable drive train, such as gear wheels, axles, and/or the like.

The housing defines an upwardly facing opening 1259 at the upper part of the housing, allowing an object to be placed in the scanner. The opening can be closed by means of a lid 1256 so as to prevent or reduce stray light from interfering with the scanning process and/or so as to prevent a user from accessing the interior of the scanner during the scanning process. However, alternative embodiments of a scanner may be provided without a lid or a different type of lid, or even without a housing.

The object support platform 1205 is stationary attached to the base plate 1260 so as to define an object support surface elevated above the base plate. The rotatable member 1210 has a generally tubular shape with an upper open end aligned with the opening 1259 of the housing and extending downwards from the opening 1259 towards the object support platform such that the object support platform extends into the bottom end of the tubular rotatable member. Hence, the object support surface of the platform is located inside the tubular rotatable member proximal to the bottom end of the rotatable member. Accordingly, the rotatable member defines a generally tubular void extending upwards above the object support platform and towards the opening 1259.

The rotatable member is arranged rotatably around an upright axis 1261 that projects upwards through a centre of the platform 1205 and that is aligned with an axial direction defined by the tubular rotatable member. To this end, the rotatable member may be connected via a bearing 1264 to the platform 1205. Alternatively or additionally, the upper end of rotatable member may be connected via a bearing around a rim of the opening 1259.

It will be appreciated that the rotatable member 1210 may be cylindrical or have a different geometry, e.g. conical, frusto-conical, dome-shaped, and/or the like.

The motor 1257 is arranged next to the platform 1205 and arranged to drive the rotation of the rotatable member 1210 via a drive mechanism, e.g. a gear wheel 1261 driven by the motor and a mating gear ring 1264 extending around the circumference of the rotatable member. It will be appreciated, however, that other placements of the motor and/or other drive trains for driving the rotatable member may be chosen.

Two digital cameras 1204 are mounted to the circumferential wall of the tubular rotatable member 1210. The cameras are mounted at respective heights relative to the platform: A lower camera is arranged just above the platform, while an upper camera is positioned proximal to the upper end of the rotatable member, i.e. at a larger height above the platform than the lower camera. The cameras are arranged in respective recesses 1258 in the circumferential wall where the depth of the recesses are selected so as to adjust the distance of the respective camera from the axis of rotation to the viewing angle of the respective cameras and the dimensions of the void for receiving an object, preferably such that the cameras are able to capture a major part of an object placed on the platform. In some embodiments, the recesses may be omitted. During the scanning process, the rotatable member is rotated by the motor around the axis of rotation 1261, either continuously or to discrete angular positions so as to allow the cameras to capture images of an object placed on the platform from different viewpoints. It will be understood that the cameras may capture images continuously or at predetermined angular positions, e.g. as described connection with the previous embodiments. The circumferential wall opposite the cameras serves as a background portion. To this end, the inward-facing surface of the background portion of the rotatable member may be formed with a predetermined color, texture, pattern, surface structure and/or the like, as described in connection with the previous embodiments.

It will be appreciated, that the platform 1205 may be provided with a supporting stand, e.g. as described in connection with the supporting stand of FIGS. 2A-D, or other form of object support base for receiving a detachable support element. Alternatively or additionally, the platform 1205 may comprise a supporting stand as described in connection with FIGS. 3A-B.

Alternatively or additionally, the platform 1205 may be provided with alternative retaining members for receiving and holding an object to be scanned. It will further be appreciated that the rotatable member and/or the platform may be provided with markers or with coupling members for receiving marker elements, e.g. as described in connection with FIGS. 4-6. It will also be appreciated that rotation of the rotatable member may be driven by a manual drive mechanism, e.g. similar to the ones described in connection with FIGS. 9 and 10. In any event, at least a part of the drive mechanism may be constructable from toy construction elements of the toy construction system.

The cameras may receive power and communicate the captured images to a processor via a wired connection, in which case the rotation of the rotatable member in the same direction may be limited to e.g. a single revolution so as to perform a complete scan of an object; thereafter the direction of rotation may be reversed during a subsequent scan. Alternatively or additionally, power and/or data may be communicated via spring connections or wirelessly.

In the claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A toy construction system comprising:
a plurality of toy construction elements, each comprising one or more coupling members configured for detachably interconnecting the toy construction elements with each other so as to form a toy construction model;
a scanning station comprising an object support for receiving a physical object, in particular a toy construction model constructed from one or more of said toy construction elements;
a sensor device operable to capture radiation from a physical object when the physical object is placed on the object support; wherein the scanning station and/or the sensor device are configured to cause the sensor device to receive radiation at different viewpoints relative to the physical object;
an interface configured to transmit a signal indicative of the captured radiation to a processor for processing the captured radiation and for creating a 3D digital representation of the physical object;
wherein the object support comprises an object support base and a support element, the support element being detachably connectable to the object support base and comprising one or more coupling members configured for releasably connecting one or more toy construction elements of the toy construction model to the object support;
wherein the support element comprises a base plate and wherein the object support base comprises a retaining member configured to engage and retain the base plate in attachment with the object support base; and
wherein the object support base comprises a user-activatable release member configured to cause, when activated, the retaining member to disengage.

2. A toy construction system according to claim 1, wherein the support element comprises a pedestal wherein said one or more coupling members configured for releasably connecting one or more toy construction elements of the toy construction model to the object support are positioned at an uppermost end of the pedestal.

3. A toy construction system according to claim 1, wherein the object support base comprises a receptacle shaped and size to snugly receive the base plate.

4. A toy construction system according to claim 1, wherein the retaining member comprises a movable locking member that is movable between an open position and a locking position.

5. A toy construction system according to claim 1, wherein the sensor device comprises an image capture device operable to capture two or more images of the physical object when the physical object is placed on the object support, wherein the two or more images are taken from different viewpoints relative to the physical object.

6. A toy construction system according to claim 1, wherein the object support comprises a turntable.

7. A toy construction system according to claim 1, further comprising a drive mechanism for operating the object support and/or the sensor device so as to change the viewpoint of the sensor device relative to the physical object.

8. A toy construction system according to claim 7, wherein the drive mechanism is at least partially constructible from said toy construction elements.

9. A toy construction system according to claim 1, wherein the scanning station comprises a base.

10. A toy construction system according to claim 9, wherein the base comprises an object support coupling member to which the object support can be detachably connected.

11. A toy construction system according to claim 10, wherein the object support comprises a turntable and wherein the object support coupling member is configured to receive the turntable such that the turntable is rotatable about an axis of rotation.

12. A toy construction system according to claim 11, wherein the base comprises one or more coupling members for attaching one or more components of a drive mechanism for driving the turntable.

13. A toy construction system according to claim 10, comprising two or more object supports selectively and detachably connectable to the object support coupling member; and wherein the two or more object supports comprise respective configurations of coupling members.

14. A toy construction system according to claim 9, wherein the base comprises a sensor coupling member for receiving the sensor device in a predetermined position and orientation relative to the turntable; and wherein the sensor device comprises one or more coupling members for detachably connecting the sensor device to the base in a predetermined spatial relation to the object support and with the object support being in a field of view of the sensor device.

15. A toy construction system according claim 9, wherein the base comprises one or more coupling members for detachably attaching one or more background construction elements configured to form a background portion when observed by the sensor device.

16. A toy construction system according to claim 9, wherein the base is configured to detachably receive different object supports and/or different sensor devices.

17. A toy construction system according to claim 9, wherein the base is configured to provide power to one or more components detachably connected to the base.

18. A toy construction system according to claim 1, wherein the scanning station comprises a background portion configured to form a background when observed by the sensor device and shaped and sized so as to define a maximum model volume small enough to be completely captured by the sensor device.

19. A toy construction system according to claim 1, wherein the sensor device comprises at least a lower and an upper imaging device; the lower imaging being configured to capture one or more images from a viewpoint no higher than a top surface of the object support; and wherein the upper imaging device is configured to capture one or more images from a viewpoint higher than the top surface of the object support and higher than the viewpoint of the lower imaging device.

20. A toy construction system according to claim 19, wherein the sensor device comprises said interface.

21. A toy construction system according to claim 20, wherein the scanning station comprises a rotatable member comprising a circumferential wall defining a void for receiving the physical object and configured to rotate around an axis of rotation projecting through said void; and wherein the object support at least partially extends into the void; and wherein the sensor device is connected to the circumferential wall.

22. A toy construction system according to claim 19, wherein the sensor device comprises one or more light sources configured to illuminate an object positioned on the turntable.

23. A toy construction system according claim 1, wherein the plurality of toy construction elements comprises one or more marker construction elements attachable to the scanning station and/or to the toy construction model within the field of view of sensor device.

24. A toy construction system according to claim 23, wherein the processor is configured, based on said signal indicative of the captured radiation, to the recognize said one or more marker construction elements, when said one or more marker construction elements are connected to the scanning station or the toy construction model within the field of view of the sensor device; and to assign one or more attributes to the created 3D digital representation.

25. A toy construction system comprising:
a plurality of toy construction elements, each comprising one or more coupling members configured for detachably interconnecting the toy construction elements with each other so as to form a toy construction model;
a scanning station comprising an object support for receiving a physical object, in particular a toy construction model constructed from one or more of said toy construction elements;
a sensor device operable to capture radiation from a physical object when the physical object is placed on the object support; wherein the scanning station and/or the sensor device are configured to cause the sensor device to receive radiation at different viewpoints relative to the physical object;
an interface configured to transmit a signal indicative of the captured radiation to a processor for processing the captured radiation and for creating a 3D digital representation of the physical object;
wherein the plurality of toy construction elements comprises one or more marker construction elements attachable to the scanning station within the field of view of sensor device; and
wherein the processor is configured, based on said signal indicative of the captured radiation, to recognize said one or more marker construction elements, when said one or more marker construction elements are connected to the scanning station within the field of view of the sensor device; and to assign corresponding one or more attributes to the created 3D digital representation.

26. A toy construction system according to claim 25, wherein at least a part of the object support is constructible from said toy construction elements including said marker construction elements.

27. A toy construction system according to claim 25, wherein the object support is configured such that a model is attachable in different orientations relative to the object support and/or at different positions on the object support.

28. A toy construction system according to claim 25, wherein the plurality of toy construction elements comprises one or more electronic toy construction elements, each comprising a communications interface for communicating information related to the toy construction element; and wherein the scanning station comprises a communication interface configured to receive the communicated information from the electronic toy construction element when the electronic toy construction element is positioned on the object support.

29. A toy construction system according to claim 25, wherein the scanning station and/or the sensor device comprises an output device operable to provide feedback related to a scanning process.

30. A toy construction system according to claim 25, wherein the scanning station and/or the sensor device comprises an accelerometer operable to detect vibrations of the scanning station during a scanning process.

31. A toy construction system according to claim 25, wherein the sensor device is arranged movable relative to the object support.

* * * * *